United States Patent
Cui et al.

(10) Patent No.: US 10,536,880 B2
(45) Date of Patent: Jan. 14, 2020

(54) ENHANCEMENT OF A CELL RESELECTION PARAMETER IN HETEROGENEOUS NETWORKS

(71) Applicants: AT&T Intellectual Property I, L.P., Atlanta, GA (US); AT&T Mobility II LLC, Atlanta, GA (US)

(72) Inventors: Zhi Cui, Sugar Hill, GA (US); Hongyan Lei, Plano, TX (US)

(73) Assignees: AT&T INTELLECTUAL PROPERTY I, L.P., Atlanta, GA (US); AT&T MOBILITY II LLC, Atlanta, GA (US)

(*) Notice: Subject to any disclaimer, the term of this patent is extended or adjusted under 35 U.S.C. 154(b) by 0 days.

(21) Appl. No.: 16/159,184

(22) Filed: Oct. 12, 2018

(65) Prior Publication Data

US 2019/0045403 A1 Feb. 7, 2019

Related U.S. Application Data

(60) Division of application No. 15/354,961, filed on Nov. 17, 2016, now abandoned, which is a continuation of
(Continued)

(51) Int. Cl.
*H04W 4/00* (2018.01)
*H04W 36/00* (2009.01)
(Continued)

(52) U.S. Cl.
CPC ....... *H04W 36/0016* (2013.01); *H04L 67/303* (2013.01); *H04W 4/70* (2018.02);
(Continued)

(58) Field of Classification Search
None
See application file for complete search history.

(56) References Cited

U.S. PATENT DOCUMENTS

| | | |
|---|---|---|
| 4,737,978 A | 4/1988 | Burke et al. |
| 5,515,419 A | 5/1996 | Sheffer |
| | (Continued) | |

FOREIGN PATENT DOCUMENTS

| | | |
|---|---|---|
| CN | 102907121 A | 1/2013 |
| EP | 1161802 B1 | 5/2008 |
| | (Continued) | |

OTHER PUBLICATIONS

LTE Advanced: HetNet eICIC/IC, qualcomm.com. 2013. Published online at [http://www.qualcomm.com/research/projects/lte-advanced/hetnets], retrieved on Jul. 15, 2014, 2 pages.
(Continued)

*Primary Examiner* — Phuongchau Ba Nguyen
(74) *Attorney, Agent, or Firm* — Amin, Turocy & Watson, LLP

(57) ABSTRACT

A cell reselection procedure in heterogeneous networks is enhanced based on utilization of per category cell reselection parameters. In one aspect, a serving access point can categorize a set of neighbor access points based on cell-type and/or cell-profile data of a set of neighbor access points. Further, the serving access point can determine cell reselection parameters for the different categories. As an example, offset data (Qoffset) can be determined for the different categories. The per category cell reselection parameters can be transmitted to user equipment coupled to the serving access point to facilitate cell reselection. In one example, the per category cell reselection parameters reduce operational costs associated with processing and transmission of system parameters.

20 Claims, 14 Drawing Sheets

Related U.S. Application Data application No. 14/261,696, filed on Apr. 25, 2014, now Pat. No. 9,516,564.

(51) Int. Cl.

| | | |
|---|---|---|
| *H04W 80/04* | (2009.01) | |
| *H04L 29/08* | (2006.01) | |
| *H04W 36/24* | (2009.01) | |
| *H04W 36/32* | (2009.01) | |
| *H04W 48/10* | (2009.01) | |
| *H04W 4/70* | (2018.01) | |
| *H04W 76/14* | (2018.01) | |

(52) U.S. Cl.
CPC ... *H04W 36/0061* (2013.01); *H04W 36/0083* (2013.01); *H04W 36/00837* (2018.08); *H04W 36/245* (2013.01); *H04W 36/32* (2013.01); *H04W 48/10* (2013.01); *H04W 76/14* (2018.02); *H04W 80/04* (2013.01); *H04W 36/00835* (2018.08)

(56) References Cited

U.S. PATENT DOCUMENTS

| | | | |
|---|---|---|---|
| 5,577,168 | A | 11/1996 | Haas et al. |
| 5,854,981 | A | 12/1998 | Wallstedt et al. |
| 5,953,667 | A | 9/1999 | Kauppi |
| 6,167,274 | A | 12/2000 | Smith |
| 6,289,220 | B1 | 9/2001 | Spear |
| 6,360,094 | B1 | 3/2002 | Satarasinghe |
| 6,445,917 | B1 | 9/2002 | Bark et al. |
| 6,839,565 | B2 | 1/2005 | Sarkkinen et al. |
| 7,130,627 | B2 | 10/2006 | Lundh et al. |
| 7,283,816 | B2 | 10/2007 | Fok et al. |
| 7,298,327 | B2 | 11/2007 | Dupray et al. |
| 7,369,861 | B2 | 5/2008 | Vare |
| 7,555,300 | B2 | 6/2009 | Scheinert et al. |
| 7,812,766 | B2 | 10/2010 | Leblanc et al. |
| 7,817,997 | B2 | 10/2010 | Nylander et al. |
| 7,995,988 | B2 | 8/2011 | Filizola et al. |
| 8,032,153 | B2 | 10/2011 | Dupray et al. |
| 8,169,931 | B2 | 5/2012 | Hui et al. |
| 8,185,124 | B2 | 5/2012 | Antic et al. |
| 8,194,579 | B2 | 6/2012 | Lee et al. |
| 8,254,982 | B2 | 8/2012 | Kuningas |
| 8,265,618 | B2 | 9/2012 | MacNaughtan et al. |
| 8,306,540 | B2 | 11/2012 | Hsieh et al. |
| 8,311,001 | B2 | 11/2012 | Kimura et al. |
| 8,325,684 | B2 | 12/2012 | Pani et al. |
| 8,331,939 | B2 | 12/2012 | Chen |
| 8,358,982 | B2 | 1/2013 | Van Der Velde et al. |
| 8,401,544 | B2 | 3/2013 | Fried et al. |
| 8,422,956 | B2 | 4/2013 | Narasimha et al. |
| 8,467,351 | B2 | 6/2013 | Liu et al. |
| 8,543,123 | B2 | 9/2013 | Moon et al. |
| 8,571,594 | B2 | 10/2013 | Luo et al. |
| 8,576,742 | B2 | 11/2013 | Yoo et al. |
| 8,582,530 | B2 | 11/2013 | Binzel et al. |
| 8,594,011 | B2 | 11/2013 | Wang et al. |
| 8,615,199 | B2 | 12/2013 | Han et al. |
| 8,755,316 | B2 | 6/2014 | Aschan et al. |
| 8,914,028 | B2 | 12/2014 | Gayde et al. |
| 8,977,268 | B2 | 3/2015 | Sivanesan et al. |
| 9,008,659 | B1 | 4/2015 | Choi et al. |
| 9,185,620 | B2 | 11/2015 | Khoryaev et al. |
| 9,516,564 | B2 | 12/2016 | Cui et al. |
| 9,635,566 | B2 | 4/2017 | Cui et al. |
| 2006/0030322 | A1 | 2/2006 | Kim et al. |
| 2007/0287444 | A1 | 12/2007 | Hulkkonen et al. |
| 2009/0067386 | A1 | 3/2009 | Kitazoe |
| 2009/0098885 | A1 | 4/2009 | Gogic et al. |
| 2009/0137249 | A1 | 5/2009 | Horn et al. |
| 2010/0184434 | A1 | 7/2010 | Jeong et al. |
| 2010/0234061 | A1 | 9/2010 | Khandekar et al. |
| 2010/0272218 | A1 | 10/2010 | Yeh et al. |
| 2011/0039575 | A1 | 2/2011 | Castillo et al. |
| 2011/0064059 | A1 | 3/2011 | Hooli et al. |
| 2011/0188481 | A1 | 8/2011 | Damnjanovic et al. |
| 2011/0216732 | A1 | 9/2011 | Maeda et al. |
| 2011/0249642 | A1 | 10/2011 | Song et al. |
| 2011/0270994 | A1 | 11/2011 | Ulupinar et al. |
| 2011/0294527 | A1 | 12/2011 | Brueck et al. |
| 2011/0319028 | A1 | 12/2011 | Magadi Rangaiah et al. |
| 2011/0319110 | A1 | 12/2011 | Futaki |
| 2012/0014333 | A1 | 1/2012 | Ji et al. |
| 2012/0033570 | A1 | 2/2012 | He et al. |
| 2012/0113812 | A1 | 5/2012 | Ji et al. |
| 2012/0115469 | A1 | 5/2012 | Chen et al. |
| 2012/0149362 | A1 | 6/2012 | Tooher et al. |
| 2012/0157082 | A1 | 6/2012 | Pedersen et al. |
| 2012/0282864 | A1 | 11/2012 | Dimou et al. |
| 2013/0023302 | A1 | 1/2013 | Sivanesan et al. |
| 2013/0033998 | A1 | 2/2013 | Seo et al. |
| 2013/0077553 | A1 | 3/2013 | Nielsen et al. |
| 2013/0142110 | A1 | 6/2013 | Li et al. |
| 2013/0165142 | A1 | 6/2013 | Huang |
| 2013/0170362 | A1 | 7/2013 | Futaki et al. |
| 2013/0196675 | A1 | 8/2013 | Xiao et al. |
| 2013/0217385 | A1 | 8/2013 | Das et al. |
| 2013/0223393 | A1 | 8/2013 | Jung et al. |
| 2013/0225169 | A1 | 8/2013 | Farnsworth et al. |
| 2013/0237201 | A1 | 9/2013 | Futaki |
| 2013/0244709 | A1 | 9/2013 | Davydov et al. |
| 2013/0267230 | A1 | 10/2013 | Lin et al. |
| 2013/0315092 | A1 | 11/2013 | Yu et al. |
| 2013/0315157 | A1 | 11/2013 | Krishnamurthy et al. |
| 2013/0343315 | A1 | 12/2013 | Tiirola et al. |
| 2014/0135028 | A1 | 5/2014 | Wang et al. |
| 2014/0198744 | A1 | 7/2014 | Wang et al. |
| 2015/0038140 | A1 | 2/2015 | Kilpatrick, II et al. |
| 2015/0264622 | A1 | 9/2015 | Ueda |

FOREIGN PATENT DOCUMENTS

| | | |
|---|---|---|
| EP | 2132949 A1 | 12/2009 |
| EP | 2575391 A1 | 4/2013 |
| EP | 2688352 A1 | 1/2014 |
| EP | 2749077 A1 | 7/2014 |
| GB | 2494107 A | 3/2013 |
| GB | 2498927 A | 8/2013 |
| JP | 2011244435 A | 12/2011 |
| JP | 2012044658 A | 3/2012 |
| JP | 2012105176 A | 5/2012 |
| JP | 2013038720 A | 2/2013 |
| WO | 2008055132 A2 | 5/2008 |
| WO | 2010151016 A2 | 12/2010 |
| WO | 2011136565 A2 | 11/2011 |
| WO | 2012015411 A1 | 2/2012 |
| WO | 2012024454 A1 | 2/2012 |
| WO | 2012140470 A1 | 10/2012 |
| WO | 2013066877 A1 | 5/2013 |
| WO | 2013138988 A1 | 9/2013 |
| WO | 2013185354 A1 | 12/2013 |

OTHER PUBLICATIONS

A Comparison of LTE Advanced HetNets and WiFi, Qualcomm Incorporated, Oct. 2011, published online at[http://www.qualcomm.com/media/documents/comparison-lte-advancedhetnets-and-wifi], Retrieved on Jul. 15, 2014, 16 pages.

Ghadialy, "Further enhanced Inter-Cell Interference Coordination (FeICIC)," The 3G4G Blog, May 1, 2014. published online at [http://blog.3g4g.co.uk/2014/05/further-enhanced-inter-cell.html], retrieved on Jul. 15, 2014, 9 pages.

Seymour, "Essential Elements of Rel-10 and Rel-11 LTE-Advanced," LTE-Advanced: Understanding 3GPP Release 10 and Beyond, Workshop presented by 4G Americas, Presentation Slide, Oct. 22, 2012, Alcatel-Lucent. published online at [http://www.4gamericas.org/UserFiles/file/Presentations/Essential%20Elements%20of%20Rel-10%20and%20Rel-11%20LTE%20Advanced%20Jim%

(56) References Cited

OTHER PUBLICATIONS

20Seymour%20Alcatel-Lucent.pdf], retrieved on Jul. 22, 2014, 13 pages.
Merwaday, et al., "Capacity Analysis of LTE-Advanced HetNets with Reduced Power Subframes and Range Expansion," arXiv preprint arXiv:1403.7802, 2014. published online at [http://arxiv.org/pdf/1403.7802], retrieved on Jul. 22, 2014, 34 pages.
Li, et al, "CoMP and interference coordination in heterogeneous network for LTE-Advanced," Globecom Workshops, IEEE, 2012, 5 pages.
Jungnickel, et al. "The Role of Small Cells, Coordinated Multi-Point and Massive MIMO in 5G" published online at [https://www.metis2020.com/wpcontent/uploads/publicationsIEEE_2014_Jungnickel_etal_Small_cells_in_5G.pdf], retrieved Jul. 21, 2014, 11 pages.
Beming et al. "LTE-SAE architecture and performance." Ericsson Review No. 3, 2007, pp. 98-104.
Nandini Deb. "An Internship Experience Report on Heterogeneous Networks." Amity Institute of Telecom Technology & Management, Internship With SABS KPO Solutions Pvt. Ltd., May-Jul. 2013, 94 pages.
Holma et al. "LTE for UMTS—OFDMA and SC-FDMA Based Radio Access." John Wiley & Sons, Ltd., 2009, 450 pages.
Holma et al. "LTE for UMTS Evolution to LTE-Advanced" Second Edition. John Wiley & Sons, Ltd., 2011, 559 pages.
Reed et al. "Spectrum Access Technologies: The Past, the Present, and the Future." Proceedings of the IEEE | vol. 100, May 13, 2012, pp. 1676-1684.
Schwarz et al. "Pushing the Limits of LTE: A Survey on Research Enhancing the Standard." IEEE Access, vol. 1, May 10, 2013, pp. 51-62.
Siddiqui et al. "Broadband Wireless Technologies." Next-Generation Wireless Technologies, Computer Communications and Networks 2013. pp. 71-103.
Vetter et al. "Enablers for Energy-Aware Cooperative Decision and Control." FP7 Information & Communication Technologies (ICT), COoperative aNd Self growing Energy awaRe Networks—CONSERN, Oct. 31, 2010, 56 pages.
Backhauling X2. Cambridge Broadband Networks Limited, Dec. 4, 2010, 13 pages.
Cackov et al. "Simulation and Performance Evaluation of a Public Safety Wireless Network: Case Study." Simulation, vol. 81, Issue 8, Aug. 2005, pp. 571-585.
Dietl et al."Location Information Service for Heterogeneous Mobile Networks—Location Trader Project." Center for Digital Technology and Management, 2006, 89 pages.
Zerfos et al. "DIRAC: A Softwarebased Wireless Router System." MobiCom'03, Sep. 14-19, 2003, 15 pages.
Wang et al. "Intersystem Location Update and Paging Schemes for Multitier Wireless Networks." 2000, MOBICOM 2000, pp. 99-109.
Zeng et al. "Worldwide Regulatory and Standardization Activities on Cognitive Radio." 2010 IEEE Symposium on New Frontiers in Dynamic Spectrum, Apr. 6-9, 2010, 9 pages.
Berger et al. "On the Advantages of Location Resolved Input Data for Throughput Optimization Algorithms in Self-Organizing Wireless Networks." Proceedings of the WS-BWA IEEE Global Communications Conference 2011 (GLOBECOM'13), Atlanta, GA, Sep. 12, 2013, 5 pages.
He et al. "An Optimal Approach for Load Balancing in Heterogeneous LTE Advanced." Third Nordic Workshop on System & Network Optimization for Wireless, Apr. 10-12, 2012, 1 page.
Ilmenau University of Technology. "Load Balancing." International Graduate School on Mobile Communications. published online at [http://www.tu-ilmenau.de/fileadmin/public/iks/files/lehre/UMTS/CellCommNets_SONLTE_WS13_part2.pdf], retrieved Feb. 12, 2014, IEEE 72nd Vehicular Technology Conference (VTC2010-Fall) (Ottawa, Canada, 2010). 19 pages.
Lobinger et al. "Load Balancing in Downlink LTE Self-Optimizing Networks." 2010 IEEE 71st Vehicular Technology Conference (VTC 2010-Spring), May 16-19, 2010, 5 pages.
Rosenberger et al. "Ruled-based Algorithms for Self-x Functionalities in Radio Access Networks." ICT-MobileSummit 2009 Conference Proceedings, 8 pages.
Siomina et al. "Load balancing in heterogeneous LTE: Range optimization via cell offset and load-coupling characterization" Communications (ICC), 2012 IEEE International Conference on Jun. 10-15, 2012, pp. 1357-1361.
Non-Final Office Action dated Mar. 2, 2016 for U.S. Appl. No. 14/505,129, 38 pages.
Non-Final Office Action dated Mar. 10, 2016 for U.S. Appl. No. 14/261,666, 41 pages.
Non-Final Office Action dated Mar. 17, 2016 for U.S. Appl. No. 14/261,696, 48 pages.
Final Office Action dated Jul. 11, 2016 for U.S. Appl. No. 14/505,129, 33 pages.
Final Office Action dated Jul. 25, 2016 for U.S. Appl. No. 14/505,129, 29 pages.
Final Office Action dated Jul. 14, 2016 for U.S. Appl. No. 14/261,666, 23 pages.
Notice of Allowance dated Dec. 5, 2016 for U.S. Appl. No. 14/505,129, 32 pages.
Non-Final Office Action dated Nov. 7, 2017 for U.S. Appl. No. 15/476,922, 56 pages.
Non-Final Office Action dated Jan. 24, 2018 for U.S. Appl. No. 15/493,115, 46 pages.
Non-Final Office Action dated Jan. 16, 2018 for U.S. Appl. No. 15/354,961, 46 pages.
Final Office Action dated Apr. 18, 2018 for U.S. Appl. No. 15/479,922, 23 pages.
Final Office Action dated Jul. 12, 2018 for U.S. Appl. No. 15/354,961, 23 pages.
Final Office Action dated Sep. 25, 2018 for U.S. Appl. No. 15/493,115, 40 pages.
Notice of Allowance dated Nov. 7, 2018 for U.S. Appl. No. 15/476,922, 79 pages.
Notice of Allowance dated Feb. 11, 2019 for U.S. Appl. No. 15/493,115, 32 pages.
Office Action dated Nov. 4, 2019 for U.S. Appl. No. 16/361,143, 71 pages.

ENHANCEMENT OF A CELL RESELECTION PARAMETER IN HETEROGENEOUS NETWORKS

CROSS REFERENCE TO RELATED APPLICATIONS

This application is a divisional of and claims the benefit of priority to each of, U.S. patent application Ser. No. 15/354,961, entitled "ENHANCEMENT OF A CELL RESELECTION PARAMETER IN HETEROGENEOUS NETWORKS," and filed on Nov. 17, 2016, which is a continuation of U.S. patent application Ser. No. 14/261,696, entitled "ENHANCEMENT OF A CELL RESELECTION PARAMETER IN HETEROGENEOUS NETWORKS," and filed on Apr. 25, 2014 (now U.S. Pat. No. 9,516,564, issued on Dec. 6, 2016). The entireties of the above-referenced applications are hereby incorporated herein by reference.

TECHNICAL FIELD

The subject disclosure relates to wireless communications, e.g., to an enhancement of a cell reselection parameter in heterogeneous networks.

BACKGROUND

With an explosive growth in utilization of communication devices, mobile telecommunications carriers are seeing an exponential increase in network traffic. To meet the demands of higher traffic and/or improve the end user experience, conventional systems deploy metro cells (e.g., small cells) that improve network coverage and capacity by offloading mobile traffic between overlapping cells.

In heterogeneous networks (HetNets), intra-frequency cell reselection and equal priority inter-frequency cell reselection for a handover of a user equipment between overlapping cells can be optimized or improved by employing a cell reselection parameter, for example, Qoffset that specifies an offset between the two cells (e.g., serving cell and a neighbor cell). Specifically, conventional serving cells broadcast the Qoffset information for each of its neighbor cell in relation to the serving cell (e.g., offset between the serving cell and each neighbor cell). As the number of cells (e.g., metro cells) deployed within an area increases, the amount of Qoffset information that is to be transmitted significantly increases. For example, if the serving cell is a macro cell and there are twenty metro cells are within a coverage area of the macro cell, then the macro cell will broadcast at least twenty non-zero Qoffsets. This results in an increase in processing resources utilized by the serving cell and/or user equipment to which the Qoffset information has been transmitted. In addition, network traffic and/or resources utilized to facilitate the transmission are also significantly increased.

DETAILED DESCRIPTION

Figure 1:
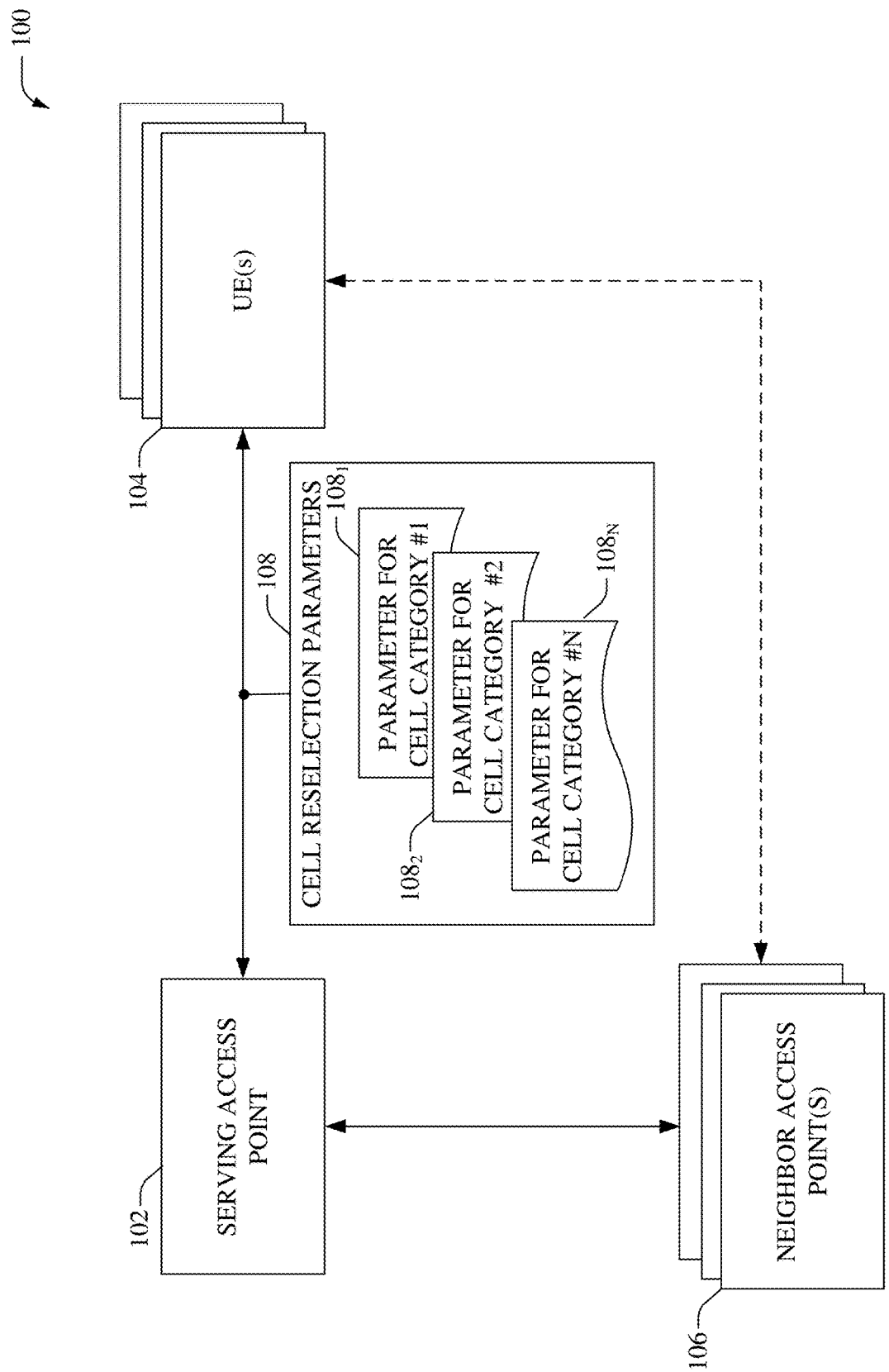
FIG. 1 illustrates an example system that facilitates a transfer of cell reselection parameter data between an access point and user equipment (UE) in a communication network.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

As used in this application, the terms "component," "module," "system," "interface," "node," "platform," "point," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment," "communication device," "mobile device," "mobile terminal," and similar terminology, refer to a wired or wireless device utilized by a subscriber or user of a wired or wireless communication service to receive or convey data, control, voice, video, sound, gaming, or substantially any data-stream or signaling-stream. The foregoing terms are utilized interchangeably in the subject specification and related drawings. Data and signaling streams can be packetized or frame-based flows. Furthermore, the terms "user," "subscriber," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms), which can provide simulated vision, sound recognition and so forth.

The systems and methods disclosed herein facilitate enhancing a cell reselection procedure in communication networks based on utilization of a parameter defined for different categories. The systems and methods can improve network efficiency and avoid the bottlenecks during cell reselection in Heterogeneous Networks (HetNet). HetNets can include different types of access nodes/cells in a wireless network. For example, macro cells, metro cells, femtocells, and/or pico cells can be deployed within a HetNet. It can be noted that WiFi access points can also be part of a HetNet. The systems and methods disclosed herein simplify system parameter configuration and reduce operational costs associated with processing and/or transmission of system parameters. In one aspect, the systems and methods disclosed herein provide per cell-type or a per category based offset values to improve scalability and radio access network (RAN) efficiency that can be applied to most any communication technology. As an example, aspects or features of the disclosed subject matter can be exploited in substantially any wired or wireless communication technology; e.g., Universal Mobile Telecommunications System (UMTS), WiFi, Worldwide Interoperability for Microwave Access (WiMAX), General Packet Radio Service (GPRS), Enhanced GPRS, Third Generation Partnership Project (3GPP) Long Term Evolution (LTE), Third Generation Partnership Project 2 (3GPP2) Ultra Mobile Broadband (UMB), High Speed Packet Access (HSPA), Zigbee, or another IEEE 802.XX technology. Additionally, substantially all aspects of the disclosed subject matter can be exploited in legacy (e.g., wireline) telecommunication technologies and/or future telecommunication technologies (e.g., 5G, whitespace, etc.).

This application is related to co-pending U.S. patent application Ser. No. 14/261,666, filed on Apr. 25, 2014, entitled "ENHANCEMENT OF ACCESS POINTS TO SUPPORT HETEROGENEOUS NETWORKS." The entirety of the foregoing application is incorporated herein by reference.

Conventional systems limit the number of neighbor cells (e.g., maximum 16 neighbor cells) for which Qoffset information can be broadcasted. However, efficiency of cell reselection can be decreased, resulting in a negative user experience and reduced overall system and spectrum efficiency. Accordingly, various embodiments herein provide improved systems, processes, etc. for setting cell reselection parameters.

Referring initially to FIG. 1, there illustrated is an example system 100 that facilitates a transfer of cell reselection parameter data between an access point and user equipment (UE) in a communication network, according to one or more aspects of the disclosed subject matter. System 100 can be part of a heterogeneous communication network (e.g., heterogeneous network (HetNet)) and can include a serving access point 102 that serves one or more user equipment (UE) 104. In addition, system 100 can include one or more neighbor access points 106, for example, that are located within a defined distance from the serving access point 102. As an example, the serving access point 102 and the one or more neighbor access points 106 can be considered as neighboring access points if the coverage areas of the serving access point 102 and the one or more neighbor access points 106 at least partially overlap (e.g., to facilitate handover/cell reselection between the cell sites), if the locations of the serving access point 102 and the one or more neighbor access points 104 satisfy a defined location criterion (e.g., are within a defined distance), if the serving access point 102 and the one or more neighbor access points 104 share a common cell edge, etc. In one aspect, the serving access point 102 and/or the one or more neighbor access points 106 can be part of a self-optimizing network (SON). As an example, the access points (102, 106) can include, but are not limited to, a base station, an eNodeB, a pico station, a WiFi access point, a femto access point, a HomeNodeB, etc.

According to an aspect, the serving access point 102 can transmit (e.g., broadcast), to the UEs 104, cell reselection parameters 108 that assist the UEs 104 to select an optimal cell (e.g., from neighbor access points 106) for cell reselection/handover. As an example, cell reselection parameters can include a Qoffset value that provides an offset between two cells (e.g., serving cell and neighbor cell) that can be utilized to encourage or discourage a UE to handover to a particular neighbor cell. Moreover, the serving access point 102 determines Qoffset values for each cell pair (e.g., serving cell within each neighbor cell) and transmits the Qoffset values to UEs 104. As the number of cells deployed within an area increase, the number of Qoffset values that are to be determined and transmitted also increases. This number can quickly escalate in HetNets, wherein several metro cells (e.g., small cells, pico cells, femtocells, etc.) can be deployed within (partially or completely) a coverage area of a macro cell. HetNets typically comprise of different type of cells and/or access points that can utilize the same or different communication protocols. In an aspect, access points (102,106) can include macro cells and/or metro cells that have significantly different characteristics. For example, a metro cell can have a lower output power and smaller coverage area than a macro cell. It is noted that the subject specification is not limited to per cell-type or per category based Qoffset parameter, and most any system parameter can be categorized based on cell-type/cell-profile data.

According to aspect, the serving access point 102 can classify and/or categorize the neighbor access points 106 based on their cell-types (e.g., macro cell, metro cell, small cell, pico cell, femtocell, etc.) and/or cell-profile data (e.g., antenna tilt/pattern, power level, multiple input multiple output (MIMO), carrier aggregation, indoor/outdoor location, capacity, etc.) and determine per category cell reselection parameters 108. For example, the serving access point 102 can receive, from the neighbor access points 106, the respective cell-type indicators (e.g., "macro cell," "femtocell," metro cell," "small cell," "pico cell," etc.) and/or cell profiles. In one aspect, the serving access point 102 can determine cell-type/cell-profile based offset data (e.g., Qoffset) that can be provided to the UEs 104 to facilitate efficient and/or optimal cell reselection (e.g., intra-frequency and/or equal priority, inter-frequency cell reselection). For example, a first offset parameter (e.g., parameter for cell category #1 ($108_1$)) can be determined for all macro cells, a second offset parameter (e.g., parameter for cell category #2 ($108_2$)) can be determined for all femto cells, a third offset parameter (e.g., parameter for cell category #N ($108_N$); wherein N can be any positive integer value) can be determined for all pico cells, and so forth. Moreover, the per category cell reselection parameters 108 can be utilized to facilitate cell ranking during cell resection by the UEs 104. As an example, a lower Qoffset can be assigned to metro cells so that they can be assigned a higher rank during cell reselection, while a higher Qoffset can be assigned to macro cells so that they can be assigned a lower rank during cell reselection. It can be noted that most any operator-based policy can be utilized to determine the Qoffset parameters.

UEs 104 can monitor and measure signal strengths of signals received from the neighbor access points 106 and determine the type/category of the neighbor access points 106. Based on the determined type/category, the UE 104 can apply the corresponding cell reselection parameter (selected from $108_1$-$108_N$) associated with the type/category to rank the neighbor access points 106. In one aspect, a UE of UEs 104 can select the neighbor cell with the highest rank and initiate a utilize cell reselection to transfer to the selected neighbor cell (as shown by the dotted line in FIG. 1). As an example, the UE can perform the cell reselection if the selected neighbor cell has a signal strength that is stronger than a signal strength of the signal received from the serving access point 102. As an example, the UEs 104 can include most any electronic communication devices such as, but not limited to, most any consumer electronic device, for example, a tablet computer, a digital media player, a digital photo frame, a digital camera, a cellular phone, a personal computer, a personal digital assistant (PDA), a smart phone, a laptop, a gaming system, etc. Further, UEs 104 can also include, LTE-based devices, such as, but not limited to, most any home or commercial appliance that includes an LTE radio. It can be noted that UEs 104 can be mobile, have limited mobility and/or be stationary. In one example, UEs 104 can include a multi-band, multi-mode, and/or multi-radio device.

Further, it is noted that the cell reselection parameters and/or cell reselection procedure disclosed in the subject specification are not limited to idle mode of operation (e.g., when the UEs 104 are not performing an ongoing communication session) and can also be utilized for a handover and/or load balancing during a connected mode of operation (e.g., when the UEs 104 are performing one or more ongoing communication sessions). As an example, different cells (e.g., small cells, macro cells, femtocells, etc.) can support different cell capacities (e.g., number of users/devices). A load balancing parameter can represent a load percentage of a target cell (e.g., neighbor access point(s) 106). As an example, a macro cell determined to have 60% load can accept a larger number of incoming UEs compared to a 60% loaded small cell. When the serving access point 102 facilitates load balancing to direct/steer/offload UEs 104 to neighbor access point(s) 106, the serving access point 102 can interpret load percentage based on cell-type data and set different criteria for a number of UEs 104 that are to be offloaded based on the cell-type data. Additionally or alternatively, the cell reselection parameters disclosed herein can include technology category based parameters that can be utilized to trigger the UEs 104 to switch from one technology to another. As the HetNet evolves, the number of different technologies (e.g., cellular, WiFi, near field communication (NFC), Bluetooth™, etc.) utilized within the HetNet can increase. In one example, when a UE 104 is served by LTE, the serving access point 102 can apply different triggers for sending the UE 104 to Wi-Fi or NFC or other technologies based on different trigger criteria.

Figure 2:
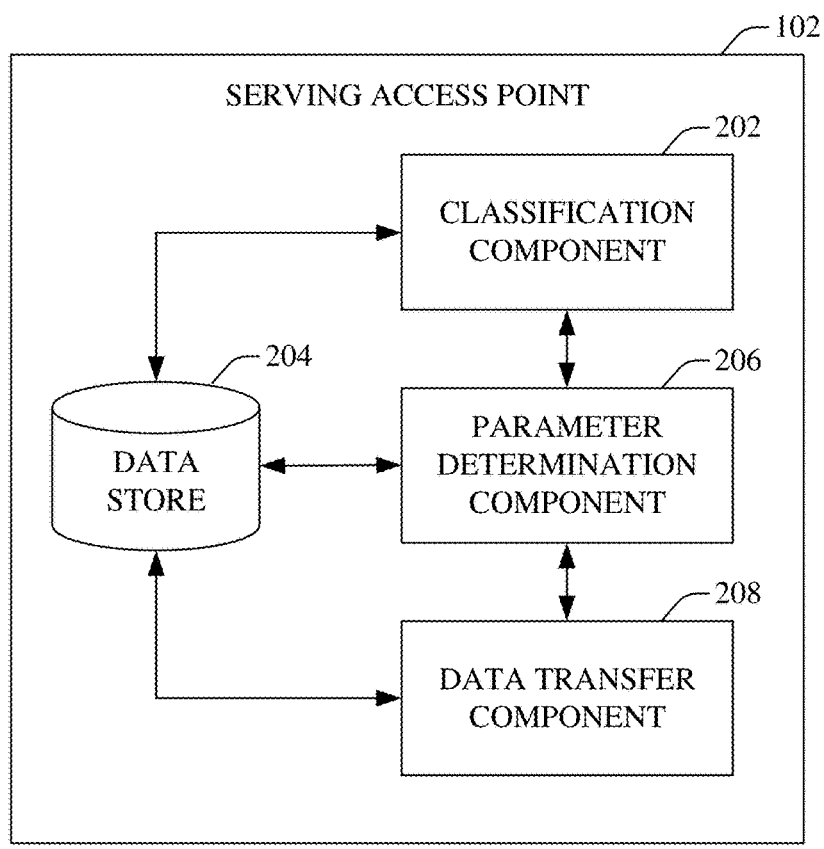
FIG. 2 illustrates an example system for determining category-based cell resection parameters.

Referring now to FIG. 2, there illustrated is an example system 200 for determining category-based cell resection parameters, in accordance with an aspect of the subject disclosure. In one aspect, system 200 facilitates determination of category-based cell resection parameters associated with neighbor access points (e.g., neighbor access points 106) that can be utilized by a set of UEs (e.g., UEs 104) to facilitate handovers and/or load-balancing. It is noted that the serving access point 102 can be most any access point, such as but not limited to a macro access point, a femto access point, a pico station, etc. and can include functionality as more fully described herein, for example, as described above with regard to system 100.

According to an embodiment, serving access point 102 can include a classification component 202 that categorizes neighbor access points, for example, based on cell-type and/or cell-profile data. Cell-type data can be indicative a type of an access point, such as such as but not limited to a macro access point, a metro access point, a femto access point, a pico station, etc. Moreover, it can be noted that cell-type data can represent a capability(ies)/characteristic(s) of the cell and is not limited to a size-related/power-related classification. In addition to differences in size (e.g., coverage areas), macro and metro cells have different features/capability (e.g., indoor vs. outdoor deployment, public vs. private access, etc.). Further, cells that are classified within the same size category (e.g., small cells) can have different power levels and thus different cell-types. As an example, the type of a cell can represent the cell's capacity (e.g., number of UEs supported by the cell; a macro cell can support thousands of UEs; a metro cell can support tens to hundreds of UEs; a consumer femto cell can support 1-10 UEs). When a macro access point evaluates load-balancing, cell-type of the neighbor access points is a significant factor that can be considered to improve load balancing efficiency. In another example, the type of a cell can represent whether the cell is part of a Closed Subscriber Group (CSG). This feature of small cells can be turned on if some enterprise customers want to limit the small cell access to their own users. Macro cells are not part of CSGs and can always be publicly accessed. Further, cell-profile data can include parameters such as, but not limited to, transmission power level, antenna pattern, antenna tilt, MIMO, carrier aggregation, location (e.g., indoor vs. outdoor), capacity (e.g., number of devices supported), etc.

The classification component 202 can also determine the cell-type of the serving access point 102 and categorize the serving access point 102 based on its cell-type. The categorized information and/or cell-type data can be stored by the classification component 202 in data store 204 (and/or a remote data store (not shown)). It is noted that the data store 204 can include volatile memory(s) or nonvolatile memory(s), or can include both volatile and nonvolatile memory(s). Examples of suitable types of volatile and non-volatile memory are described below with reference to FIG. 12. The memory (e.g., data stores, databases) of the subject systems and methods is intended to comprise, without being limited to, these and any other suitable types of memory.

Referring back to FIG. 2, a parameter determination component 206 can determine cell reselection parameters that can be utilized for intra-frequency and/or inter frequency cell reselection. As an example, the cell reselection parameters can comprise, but are not limited to, a physCellId parameter, (e.g., Physical Cell Identifier of the neighbor cell), intraFreqBlackCellList parameter (e.g., a list of blacklisted intra-frequency neighbor cells that are not considered for cell reselection), csg_PhysCellIdRange parameter (e.g., a set of physical cell identities reserved for CSG cells); intraFreqNeighCellList parameter (e.g., a list of intra-frequency neighbor cells with specific cell reselection parameters), dl-CarrierFreq parameter (e.g., carrier frequency that helps the UE to search the cells), q-RxLevMin parameter (e.g., minimum Reference Signal Received Power value of an inter-frequency cell), p-Max parameter (e.g., maximum allowed uplink transmit power of the cell), t-ReselectionEUTRA parameter (e.g., a time to trigger cell reselection), t-ReselectionEUTRA-SF parameter (e.g., scaling factors for Medium and High mobility), threshX-High parameter (e.g., Threshold (in dB) used by a UE for cell reselection to a higher priority cell), threshX-Low parameter (e.g., Threshold (in dB) used by a UE for cell reselection to a lower priority cell), allowedMeasBandwidth parameter (e.g., defined in terms of resource blocks associated with a specific channel bandwidth), cellReselectionPriority parameter (e.g., absolute priority of the frequency layer), neighCellConfig parameter (e.g., information regarding the neighbor cells), interFreqBlackCellList parameter (e.g., blacklisted cells that are not to be considered for cell reselection), etc.

In addition, the parameter determination component 206 can determine a cell-type/profile based offset parameter (e.g., Qoffset). As an example, an offset value is determined and assigned to each category of neighbor cells determined by the classification component 202. In one aspect, the offset parameter (e.g., Qoffset) can be determined based on most any operator-defined/service provider-defined policy that is received by the parameter determination component 206 from a network device (not shown). Additionally or alternatively, the offset parameter (e.g., Qoffset) can be determined based on real-time network data (e.g., traffic/congestion, etc.) to facilitate load balancing. Typically, the offset parameter (e.g., Qoffset) can be defined in order to give network operators flexibility to control traffic between the cells. Moreover, the offset parameter (e.g., Qoffset) can provide a bias that encourages or discourages a UE to connect with a specific type of neighbor cell (e.g., based on operator-defined/service provider-defined policy and/or load balancing mechanisms). For example, UEs can be encouraged to couple to femtocells and/or discouraged to couple to macro cells. Accordingly, a small set of Qoffset values (for each category) can be determined as compared to determining a Qoffset value for each neighbor cell and serving cell pair (e.g. resulting in a large set of Qoffset value as the neighbor cell density increases). As an example, the Qoffset values can comprise most any positive of negative rational number in decibels (dB). In one aspect, the parameter determination component 206 can determine a first set of Qoffset values (e.g., Qoffset-to-Macro, Qoffset-to-Metro, Qoffset-to-femto, Qoffset-to-pico, Qoffset-to-catagory#1, Qoffset-to-catagory#2, Qoffset-to-catagory#3, etc.) for intra-frequency reselection, and a second set of Qoffset values (e.g., Qoffset-to-Macro, Qoffset-to-Metro, Qoffset-to-femto, Qoffset-to-pico, Qoffset-to-catagory#1, Qoffset-to-catagory#2, Qoffset-to-catagory#3, etc.) for inter-frequency cell reselection. This can be extended when cell-profile data is used, e.g., to distinguish between 1 W and 5 W small cells (e.g., by providing a Qoffset-to-1Wcells and a Qoffset-to-5 Wcells). Generally, the offset parameter is utilized (e.g., by the UE) only when the serving access point 102 and the neighbor access point are determined to have different cell-types/categories. If the serving access point 102 and the neighbor access point belong to the same cell-type/category, Qoffset=0. As an example, if Qoffset is determined to be zero, the Qoffset is not broadcast to the UEs. In one aspect, the parameter determination component 206 can store the Qoffset values in the data store 204.

Further, a data transfer component 208 can facilitate a transmission of the cell reselection parameters (e.g., including the cell-type/category based offset parameter) to UEs (e.g., UEs 104) that are coupled to the serving access point 102, for example, periodically, at a defined time, based on expiration of an event, on-demand, etc. As an example, the data transfer component 208 can transmit the cell reselection parameters via one or more cell broadcast messages, such as, but not limited to, System Information Block (SIB) messages, over one or more layers (different radio access technologies (RATs) and/or frequencies). In one embodiment, the cell reselection parameters can be included within or appended to an SIB message that can contain other information. Alternatively, the cell reselection parameters can be transmitted as a new SIB message. It is noted that the data transfer component 208 is not limited to broadcasting the cell reselection parameters, and that the data transfer component 208 can transmit the cell reselection parameters to one or more of the UEs via various different messages, such as, but not limited to, a Short Message Service (SMS) message (e.g., SMS Cell Broadcast (SMS-CB) messages and/or SMS Peer-to-Peer (SMPP) messages), a Multimedia Messaging Service (MMS), an email message, a Wireless Application Protocol (WAP) push message, an Unstructured Supplementary Service Data (USSD), or any combination thereof. Further, the data transfer component 208 is not limited to transmitting the same messages to all the UEs and the data transfer component 208 can customize the messages for the UEs based on various factors, such as, but not limited to, a subscriber class associated with the UEs. For example, messages transmitted to UEs that are associated with a base rate plan can include Qoffset values associated with fewer categories than messages transmitted to UEs that are associated with higher tier subscriber classes, which can include detailed and/or comprehensive Qoffset information.

As an example, the data transfer component 208 can transmit the following intra-frequency data via an enhanced SIB4 message:

```
-- ASN1START
SystemInformationBlockType4 ::=        SEQUENCE {
    intraFreqNeighCellList             IntraFreqNeighCellList  OPTIONAL, -- Need OR
    intraFreqBlackCellList             IntraFreqBlackCellList  OPTIONAL, -- Need OR
    csg-PhysCellIdRange                PhysCellIdRange         OPTIONAL, -- Cond CSG
    ...,
    lateNonCriticalExtension           OCTET STRING            OPTIONAL  -- Need OP
}
IntraFreqNeighCellList ::= SEQUENCE (SIZE (1..maxCellIntra)) OF
IntraFreqNeighCellInfo
IntraFreqNeighCellInfo ::=             SEQUENCE {
    physCellId          PhysCellId,              OPTIONAL
    q-OffsetCell        Q-OffsetRange,           OPTIONAL
    macroPCIRange       PhysCellId,
    metroPCIRange       PhysCellId,
    q-OffsetToMetro     Q-OffsetRange,...
    q-OffsetToMacro     Q-OffsetRange,...
}
IntraFreqBlackCellList ::= SEQUENCE (SIZE (1..maxCellBlack)) OF PhysCellIdRange
-- ASN1STOP
```

As another example, the data transfer component 208 can transmit the following inter-frequency data via an enhanced SIB5 message:

```
IntraFreqNeighCellInfo ::=             SEQUENCE {
    physCellId          PhysCellId,              OPTIONAL
    q-OffsetCell        Q-OffsetRange,           OPTIONAL
    macroPCIRange       PhysCellId,
    metroPCIRange       PhysCellId,
    q-OffsetToMetro     Q-OffsetRange,...
    q-OffsetToMacro     Q-OffsetRange,...
```

Although the above examples depicts only two categories of Qoffset parameters (e.g., q-OffsetToMetro and q-OffsetToMacro), it is to be noted that the subject specification is not so limited and most any number of categories can be determined based on the ell-type/cell-profile data and transmitted via the SIB4 and/or SIB5 messages. Further, it can be noted that the serving access point 102 can also determine a specific $Qoffset_{s,n}$ value for a neighbor access point (n) in relation to the serving access point 102 (s) (e.g., via parameter determination component 206). In this example scenario, the specific $Qoffset_{s,n}$ value can be transmitted to the UE (e.g., via data transfer component 208) and can override the cell-type/cell-profile based Qoffset value. System 200 improves network efficiency of the communication network and avoids the cell reselection scalability bottleneck in a HetNet environment. Further, system 200 simplifies system parameter configuration and significantly reduces operational costs.

Figure 3A:
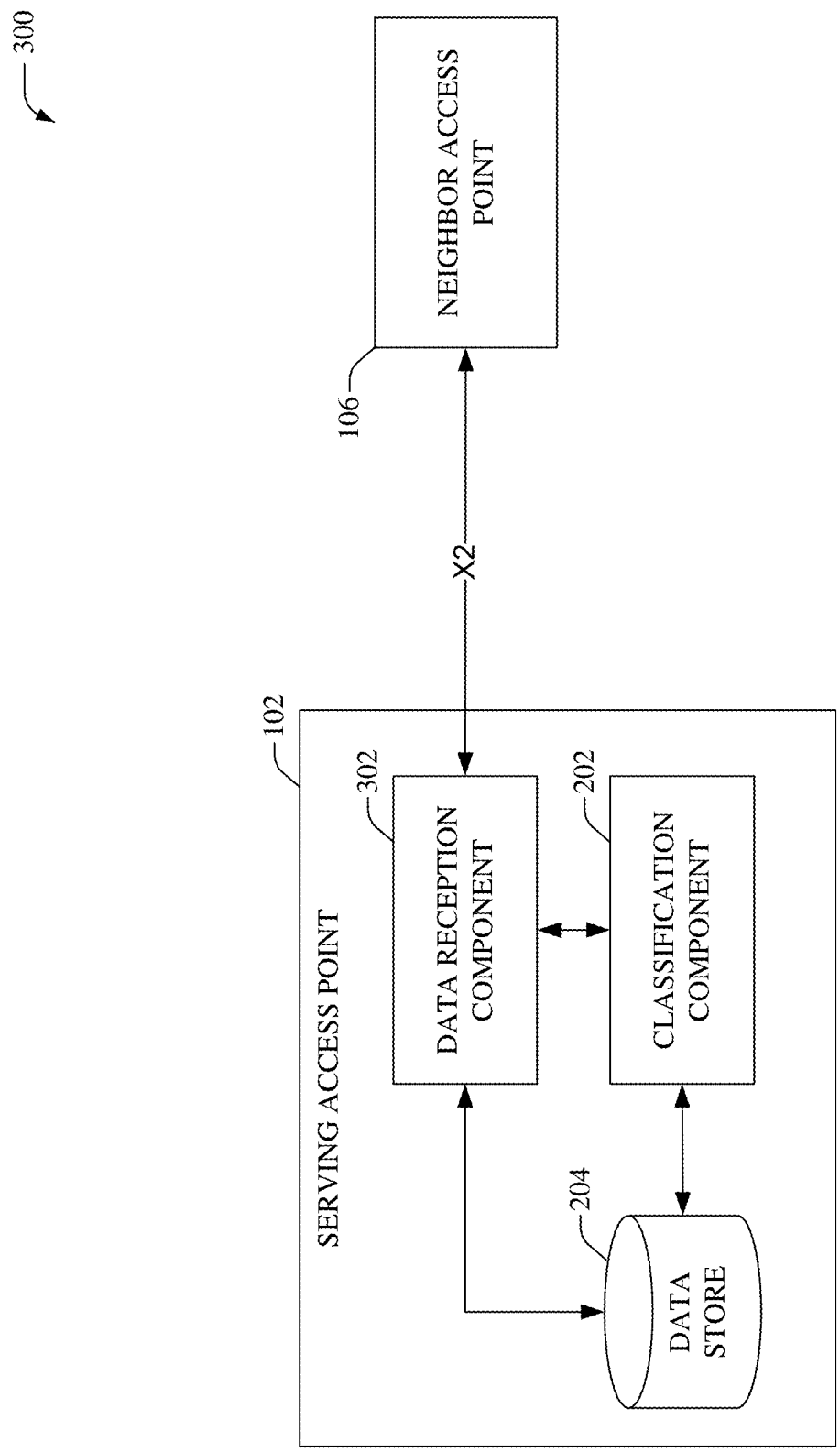
FIGS. 3A-3C illustrate example systems that facilitate a transfer of cell-type/cell-profile data between access points of a communication network.
Figure 3B:
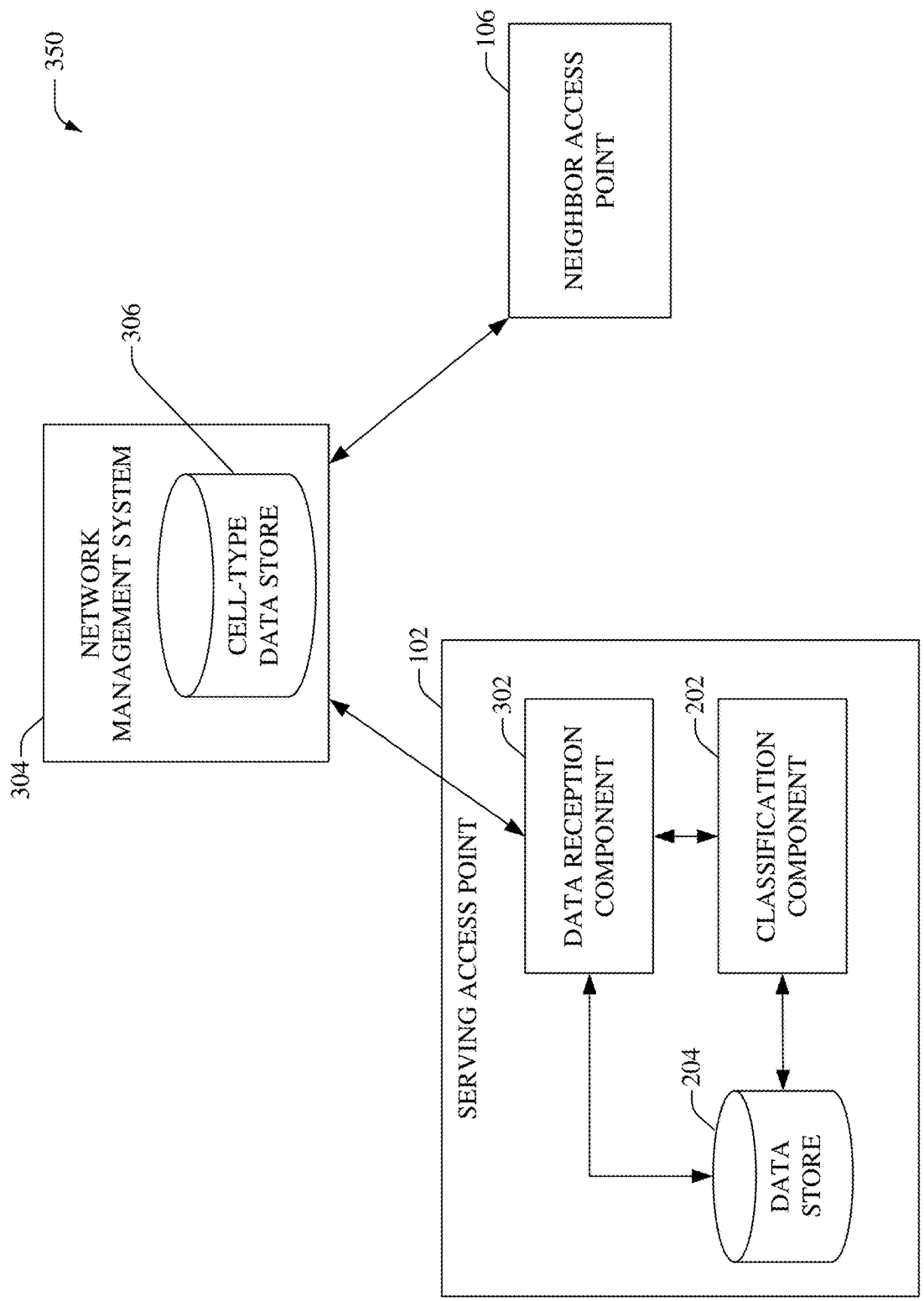
Figure 3C:
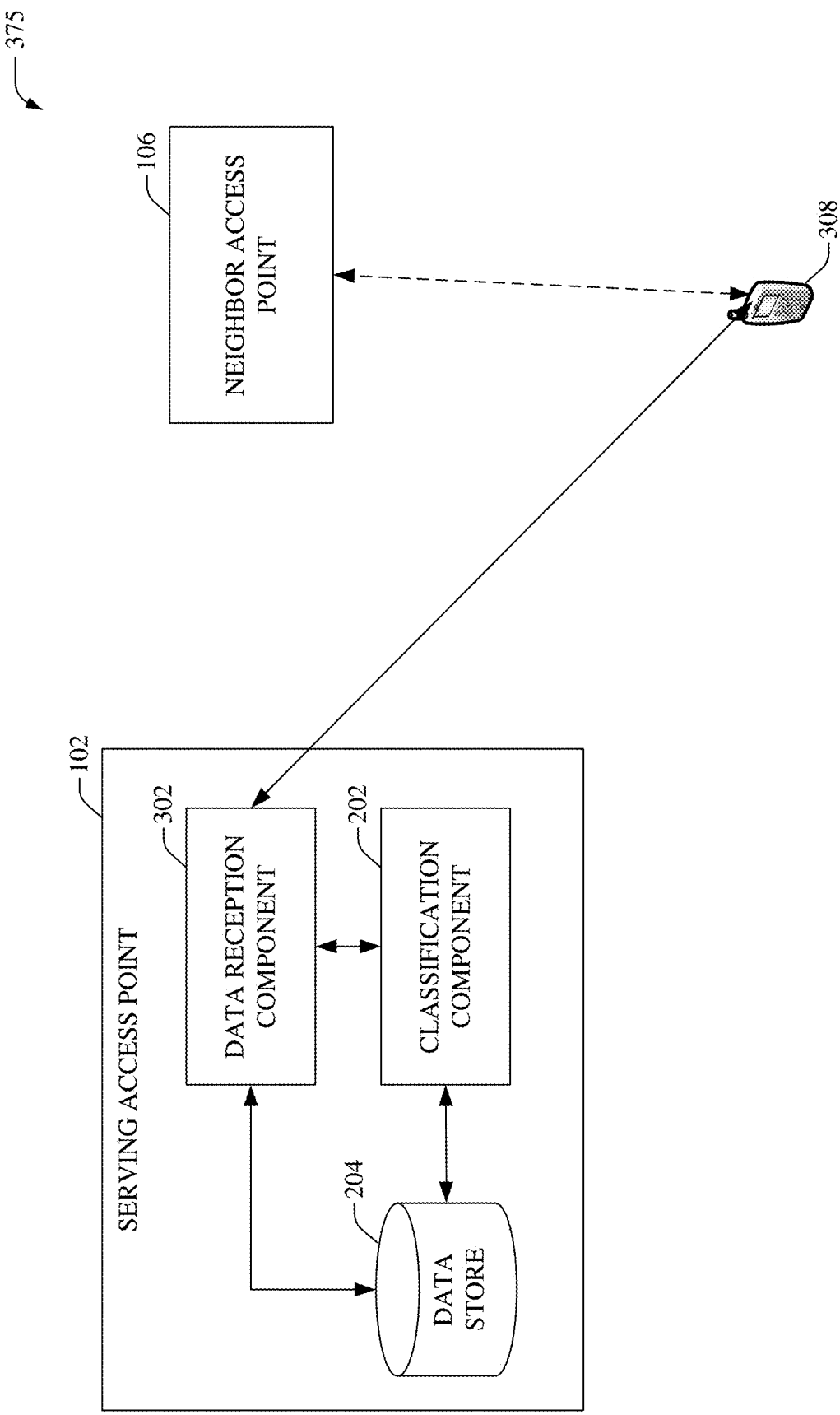

Referring now to FIGS. 3A-3C, there illustrated are example systems (300, 350, 375) that facilitate a transfer of cell-type/cell-profile data between access points of a communication network (e.g., cellular network, HetNet, etc.), according to an aspect of the subject disclosure. It is noted that the serving access point 102, the neighbor access point 106, the classification component 202, and the data store 204 can include functionality as more fully described herein, for example, as described above with regard to systems 100 and 200. In one example, one or more of the neighbor access points 106 can include, but is not limited to an access point that is operated and/or deployed by a service provider of the communication network that operates and/or deploys the serving access point 102, and that utilizes the same or different radio technologies for communication with the UEs (e.g., UE 104) as utilized by serving access point 102.

FIG. 3A illustrates example system 300 that depicts a transmission of cell-type/cell-profile data between the neighbor access point 106 and the serving access point 102 via a peer-to-peer interface. In one aspect, a control plane protocol, such as, but not limited to an access point-to-access point signaling protocol can be utilized for the transmission. For example, an X2-application protocol (AP) on the X2 interface can be utilized for the transmission. It is noted that the X2 interface can be a logical interface between neighbor access points and is not limited to a dedicated physical connection between access points. The X2 interface can couple access points via the existing IP transport network. For lowest latency and minimum loading of the transport network, the path of the physical X2 connection can be kept as short as possible, for example, by utilizing point-to-multipoint backhaul links. However, it is to be noted that the backhaul link can have most any configuration (e.g., point-to-point).

In an aspect, the cell-type/cell-profile data of the neighbor access point 106 can be transmitted to the serving access point 102 and/or the cell-type/cell-profile data of the serving access point can be transmitted to the neighbor access point 106. As an example, the data reception component 302 can facilitate an exchange of cell-type/cell-profile data during a set-up or initialization of the X2 interface between the serving access point 102 and the neighbor access point 106. Additionally or alternatively, the data reception component 302 can facilitate the exchange of cell-type/cell-profile data after the X2 interface between the serving access point 102 and the neighbor access point 106 has been set up. It can be noted that the cell-type/cell-profile data can be transmitted at most any time, such as, but not limited to, periodically, on-demand, in response to an event (e.g., change in cell-profile data, addition of the access point to the network, etc.), at a predefined time, etc. In one embodiment, the cell-type/cell-profile data can be included within or appended to an X2 Setup request message and/or X2 Setup response message that are exchanged during initialization of the X2 interface. Alternatively, the cell-type/cell-profile data can be transmitted as a new/separate message.

As discussed supra, the cell-type data can represent capabilities of an access point/cell. For example, the cell-type data can specify whether the cell is a macro cell, metro cell, femtocell, pico cell, etc. Optionally or additionally, cell-profile data can provide additional information regarding the access point/cell, such as, but not limited to, antenna tilt/pattern, power level, MIMO, carrier aggregation, indoor/ outdoor location, public/private access, capacity, etc. This data can be utilized to determine whether a UE (e.g., UE 104) is to be encouraged to couple to the access point or be discouraged to couple to the access point (e.g., based on adjusting the Qoffset parameter value transmitted to the UE).

Referring now to FIG. 3B, there illustrated is an example system 350 that facilitates transmission of cell-type/cell-profile data via a network management device, according to one or more aspects of the disclosed subject matter. In one aspect, a network management system 304 of the communication network can receive (e.g., via a push or pull configuration) cell-type/cell-profile data associated with the serving access point 102 and/or the neighbor access point 106. It can be noted that the network management system 304 can be locally coupled to the serving access point 102 and/or the neighbor access point 106, for example, located within the radio access network (RAN) (e.g., be part of the self optimizing network (SON)) or can be located elsewhere within the communication network. Moreover, the network management system 304 can store data received from one or more access points, including the neighbor access point 106, in a cell-type data store 306. This stored data can be accessed by the serving access point 102, for example, if the serving access point 102 does not directly receive the cell-type/cell-profile data from the neighbor access point 106.

According to an aspect, the data reception component 302 can initiate a query for the cell-type/cell-profile data. As an example, the query can be transmitted periodically (e.g., based on predefined timing intervals), on-demand, in response to an event, etc. In response to receiving the query, the network management system 304 can identify access points that are neighboring the serving access point 102 (including neighbor access point 106), lookup cell-type/cell-profile data received from the neighboring access points in the cell-type data store 306, and transmit the data to the serving access point 102. In an aspect, the query generated by the data reception component 302 can include data such as (but not limited to) the served physical cell ID (PCI) of the serving access point 102, the cell identifier (ID) associated with the serving access point 102, the Basic Service Set IDentifier (BSSID) and/or the Service Set Identifier (SSID). Based on the PCI/SSID/BSSID, the network management system 304 can identify the network sectors corresponding to the serving access point 102 and/or the one or more neighboring access points (e.g., neighbor access point 106), dynamically determine (and/or lookup) the corresponding cell-type/cell-profile data, and transmit the determined data to the serving access point 102. The serving access point 102 can receive the cell-type/cell-profile data (e.g., via the data reception component 302), store the cell-type/cell-profile data (e.g., via the data store 204) and analyze the cell-type/cell-profile data to facilitate classification of the neighbor access point 106 (e.g., via the classification component 202).

Referring now to FIG. 3C, there illustrated is an example system 375 that facilitates transmission of cell-type/cell-profile data via a UE 308, according to one or more aspects of the disclosed subject matter. UE 308 can be substantially similar to UEs 104 and can include functionality as more fully described herein, for example, as described above with regard to UEs 104. In one aspect, data reception component 302 can receive (e.g., via a push or pull configuration) enhanced UE history information from UE 308. The enhanced UE history information can be received during registration/attachment of the UE 308 with the serving access point 102, periodically (e.g., based on predefined timing intervals), on-demand, in response to an event, etc. As an example, the enhanced UE history information can comprise information about cells (e.g., including a neighboring cell associated with neighbor access point 106) that the UE 308 has been served by in an active state, prior to the UE 308 attaching/registering with the serving access point 102. In one aspect, the cell-type/cell-profile data can be included within and/or be appended to the enhanced UE history information. For example, the cell-type data can specify whether the cell is a macro cell, metro cell, femto-cell, pico cell, etc. Optionally or additionally, cell-profile data can be included within the enhanced UE history information that provides additional information regarding the access point/cell, such as, but not limited to, antenna tilt/pattern, power level, MIMO, carrier aggregation, indoor/outdoor location, public/private access, capacity, etc.

In an aspect, the data reception component 302 can parse the UE history information to extract the cell-type/cell-profile data. The extracted information can be stored in the data store 204. This stored data can be accessed by the classification component 202, for example, to assign a category to the neighbor access point 106, which in turn can be utilized to determine whether UEs that are served by the serving access point 102 (e.g., including UE 308) are to be encouraged to couple to the neighbor access point 106 or be discouraged to couple to the neighbor access point 106 (e.g., based on adjusting the Qoffset parameter value transmitted to the UEs).

Figure 4:
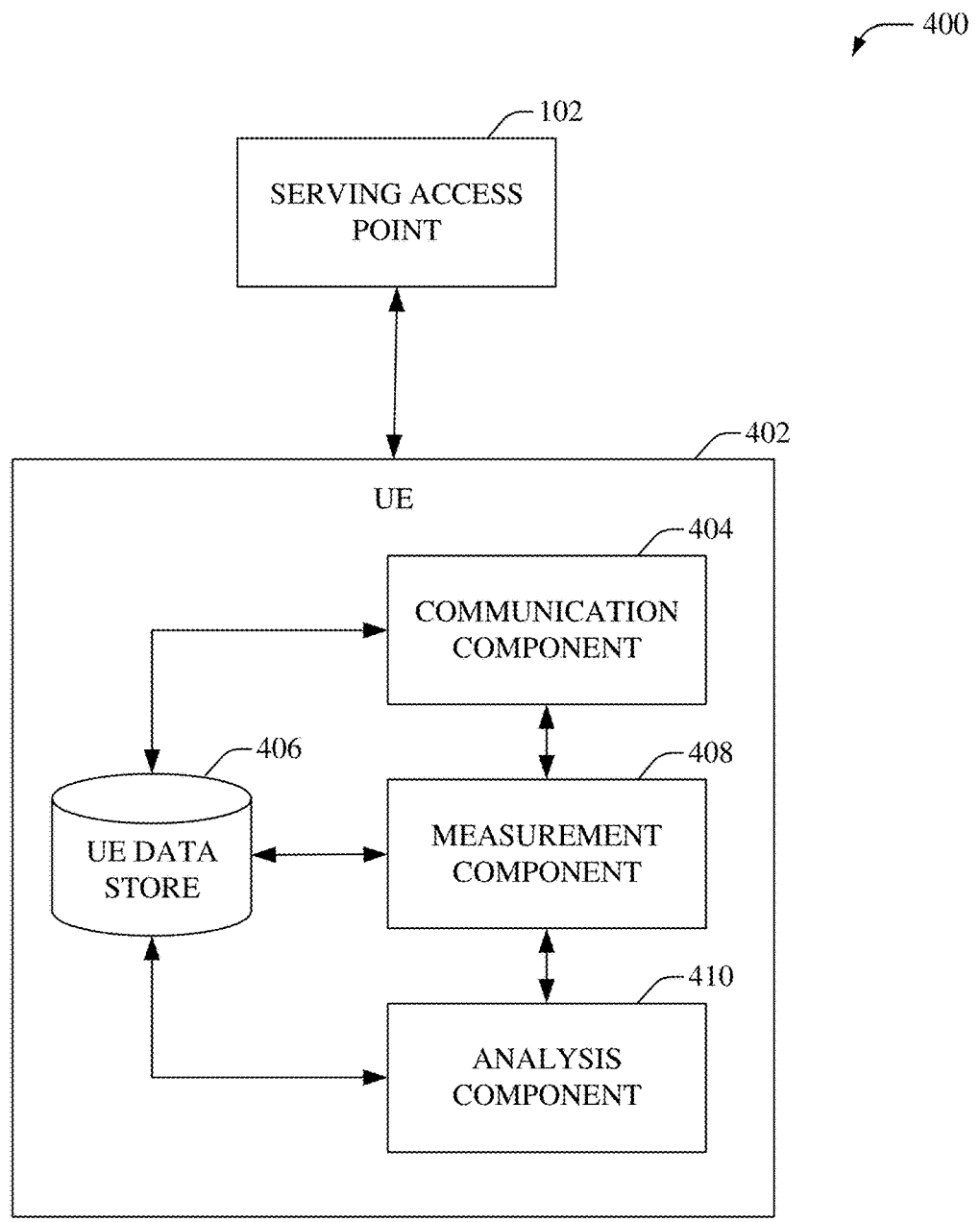
FIG. 4 illustrates an example system that facilitates cell reselection based on cell-type/cell-profile data.

FIG. 4 illustrates an example system 400 that facilitates cell reselection based on cell-type/cell-profile data in accordance with an aspect of the subject disclosure. It can be noted that the serving access point 102 can include functionality as more fully described herein, for example, as described above with regard to systems 100-300, 350, and 375. In addition, UE 402 can be substantially similar to UEs 104 and/or UE 308 and can include functionality as more fully described herein, for example, as described above with regard to UEs 104 and/or UE 308.

In one aspect, a communication component 404 can receive cell reselection parameters (e.g., including the cell-type/category based offset parameter) transmitted by the serving access point 102. The cell reselection parameters can be received via one or more cell broadcast messages, for example, periodically, at a defined time, based on expiration of an event, on-demand, etc. It is noted that the communication component 404 is not limited to receiving the cell reselection parameters via a broadcast message and that the communication component 404 can receive the cell reselection parameters via various different messages, such as, but not limited to a SMS message (e.g., SMS-CB messages and/or SMPP messages), a MMS message, an email message, a WAP push message, an USSD message, or any combination thereof. Further, the cell reselection parameters can be received, read and/or followed by the UE 402, when the UE 402 is operating in an idle mode (e.g., no ongoing communication sessions) and/or in a connected mode (e.g., performing an on-going communication session). Subsequent to receiving the cell reselection parameters, the communication component 404 can store the cell reselection parameters in a UE data store 406.

According to an aspect, a measurement component 408 is employed by UE 402 to perform signal measurement on neighbor access points (e.g., neighbor access points 106) identified by their PCIs. As an example, the measurement component 408 can measure signal levels of broadcast control channel (BCCH) transmissions of the neighbor access points. Further, an analysis component 410 can be employed by UE 402 to select an access point from the detected to neighbor access points, such that the UE 402 can disconnect from the serving access point 102 and camp onto the selected access point. In one aspect, the analysis component 410 can employ the cell reselection parameters (e.g., including the per cell-type/cell-profile Qoffset) to facilitate selection/reselection of the access point. Further, the analysis component 410 can employ the cell reselection parameters to control the number of cell reselections (e.g., within a defined time period). Furthermore, analysis component 410 can employ the cell reselection parameters to determine blacklisted cells and/or any restrictions for camping on the selected access point. If determined that the selected access point has not been blacklisted and no restrictions exists, the UE 402 can initiate attachment signaling to connect with the selected access point.

Figure 5:
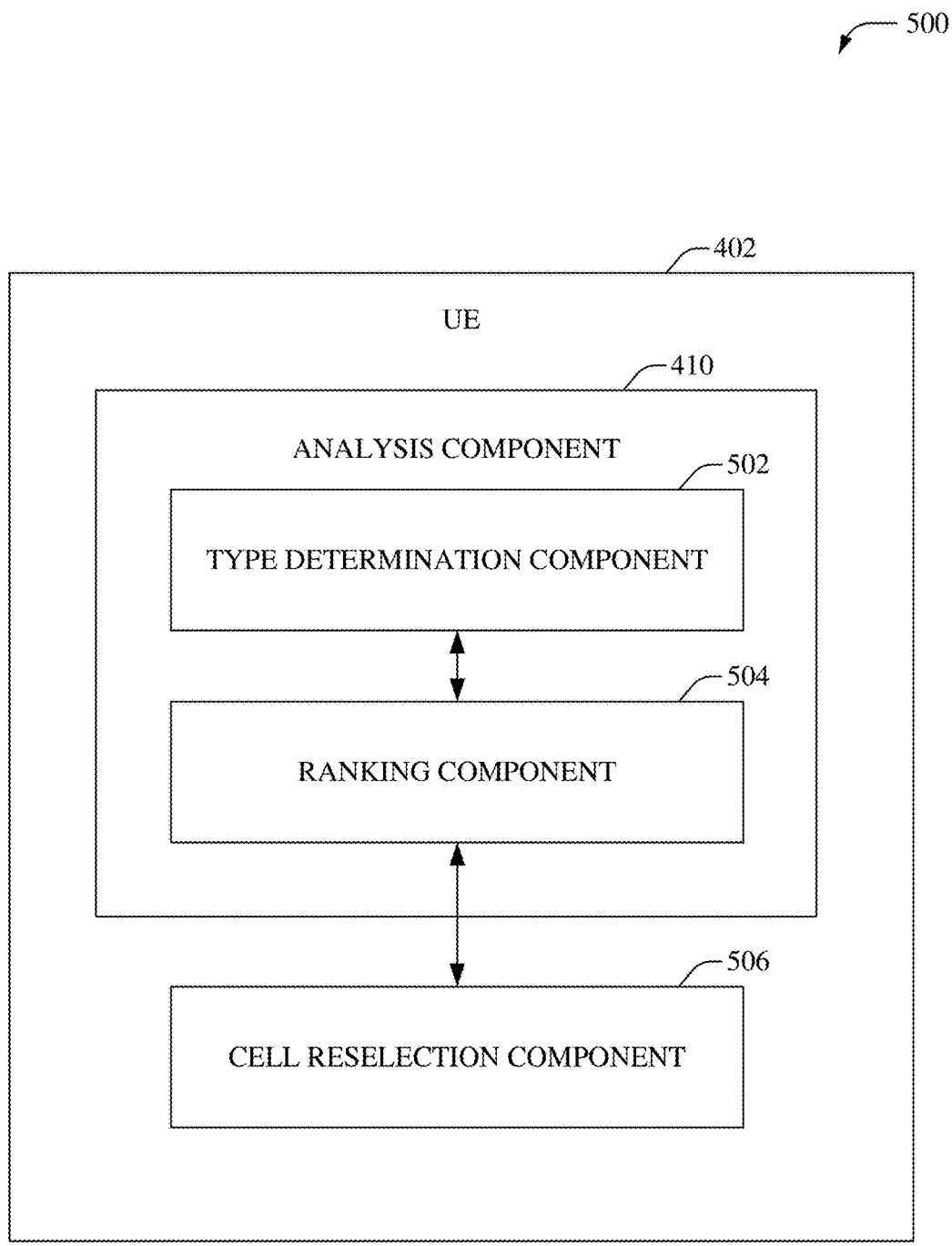
FIG. 5 illustrates an example system that facilitates prioritizing neighbor cells based on per category offset data.

FIG. 5 illustrates an example system 500 that facilitates prioritizing neighboring cells based on per category offset data, according to an aspect of the subject disclosure. It can be noted that the UE 402 and analysis component 410 can include functionality as more fully described herein, for example, as described above with regard to systems 400.

A type determination component 502 can analyze information detected by the measurement component 408 to identify cell-type/cell-profile of a neighbor access point. In one aspect, the type determination component 502 can compare the PCI of the neighbor access point with a predefined PCI range reserved for a specific type of cell. For example, if the PCI of the neighbor access point lies within a PCI range reserved for macro cells, the type determination component 502 can determine that the neighbor access point is a macro access point; if the PCI of the neighbor access point lies within a PCI range reserved for femto cells, the type determination component 502 can determine that the neighbor access point is a femto access point; and so on. The PCI ranges can be transmitted to the UE 402 via a network device (e.g., including the serving access point 102) at most any time. Further, the type determination component 502 can determine the cell-type/cell-profile of the serving access point 102 (e.g., based on information received from the serving access point 102).

Based on the identified types/categories of the serving access point 102 and the neighbor access point, the type determination component 502 can select a value of a cell reselection parameter (e.g., Qoffset) that is to be employed for ranking the neighbor access point, for example, via a ranking component 504. As an example, if the type determination component 502 determines that the serving access point 102 is a macro access point and the neighbor access point is a metro access point, the q-OffsetToMetro value can be utilized as the Qoffset value. In another example, if the type determination component 502 determines that the serving access point 102 is a metro access point and the neighbor access point is a macro access point, the q-OffsetToMacro value can be utilized as the Qoffset value. Further, if the type determination component 502 determines that both the serving access point 102 and the neighbor access point belong to the same type/category, for example, are both macro access points or are both metro access points, Qoffset will be zero. In addition, if a specific Qoffsets,n for the neighbor access point has been provided by the serving access point 102 (e.g., via a cell broadcast message), the specific $Qoffset_{s,n}$ value can override the cell-type/cell-profile based Qoffset and the type determination component 502 can select the $Qoffset_{s,n}$ value as the Qoffset.

In one aspect, the ranking component 504 can prioritize and/or rank neighbor access points based on a cell-ranking criterion (R-criterion) that utilizes the cell reselection parameters received from the serving access point 102 (e.g., via SIBs). As an example, the ranking component 504 can determine R values for the serving cell (Rs) and the neighbor cells (Rn), as defined below:

$$\text{For the serving cell: } Rs = Q_{meas,s} + Q_{Hyst} \quad (1);$$

$$\text{For each neighboring cell: } Rn = Q_{meas,n} - Q_{offset} \quad (2).$$

Wherein, $Q_{meas,s}$ is the measured value in Reference Signal Received Power (RSRP) of the signal transmitted by the serving cell, $Q_{meas,n}$ is the measured value in RSRP of the signal transmitted by the neighboring cell $Q_{Hyst}$ is a hysteresis value applied to the serving cell, and $Q_{offset}$ is the offset value selected by the type determination component 502. Further, a cell reselection component 506 performs cell re-selection based on the calculated R-values. For example, if the neighbor cell is better ranked than the serving cell (e.g., Rn>Rs), the cell reselection component 506 reselects the neighbor cell and initiates attachment to the neighbor access point. Moreover, when more than one neighbor cells exist, the neighbor cell that has the highest Rn value can be selected and the cell reselection component 506 can facilitate camping of the UE 402 on the highest ranked neighbor cell. Additionally or alternatively, ranking and reselection procedure (e.g., via the ranking component 504 and the cell reselection component 506) can be employed for inter frequency with equal priority cell reselection using the cell-type specific Qoffset (e.g., received via enhanced SIB5).

Figure 6:
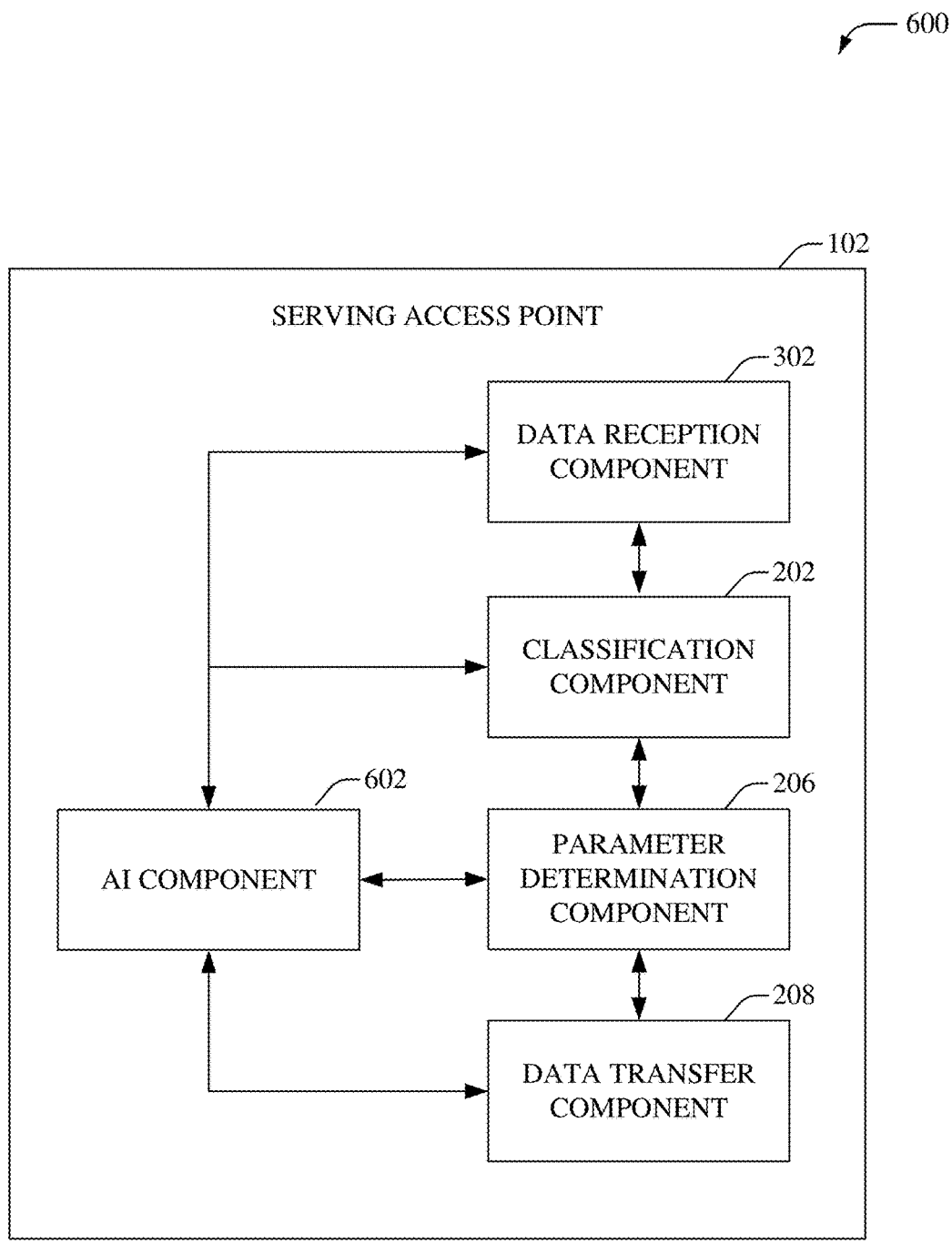
FIG. 6 illustrates an example system that facilitates automating one or more features in accordance with the subject embodiments.

Referring now to FIG. 6, there illustrated is an example system 600 that employs one or more artificial intelligence (AI) components (602), which facilitate automating one or more features in accordance with the subject embodiments. It can be appreciated that the serving access point 102, the classification component 202, the parameter determination component 206, the data transfer component 208, and the data reception component 302, can include respective functionality, as more fully described herein, for example, with regard to systems 100-500.

In an example embodiment, system 600 (e.g., in connection with automatically determining and transmitting cell reselection parameters etc.) can employ various AI-based schemes for carrying out various aspects thereof. For example, a process for determining an optimal time/schedule to receive/update cell-type/cell-profile data, an optimal time/schedule to transfer the per cell-type/cell-profile based cell reselection parameters, a number of categories based on the cell-type/cell-profile data, classification of the cell reselection parameters, etc. can be facilitated via an automatic classifier system implemented by AI component 602. A classifier can be a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. In the case of communication systems, for example, attributes can be information received from UEs and/or access points, and the classes can be categories or areas of interest (e.g., levels of priorities). A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein can also be inclusive of statistical regression that is utilized to develop models of priority.

As will be readily appreciated from the subject specification, an example embodiment can employ classifiers that are explicitly trained (e.g., via a generic training data) as well as implicitly trained (e.g., via observing access point/ UE behavior, user/operator preferences or policies, historical information, receiving extrinsic, type of UE, etc.). For example, SVMs can be configured via a learning or training phase within a classifier constructor and feature selection module. Thus, the classifier(s) of AI component 602 can be used to automatically learn and perform a number of functions, including but not limited to determining according to a predetermined criteria when and/or or to which devices are the per category cell reselection parameters to be transmitted, a schedule according to which the cell-type/cell-profile data is to be received/updated, a number of categories for which cell reselection parameters are to be transmitted, classification of the cell reselection parameters, etc. The criteria can include, but is not limited to, historical patterns and/or trends, user preferences, service provider preferences and/or policies, location of the access point, current time, access preferences (e.g., public or private) of the serving access point 102 and/or neighbor access points, network load, and the like.

Figure 7:
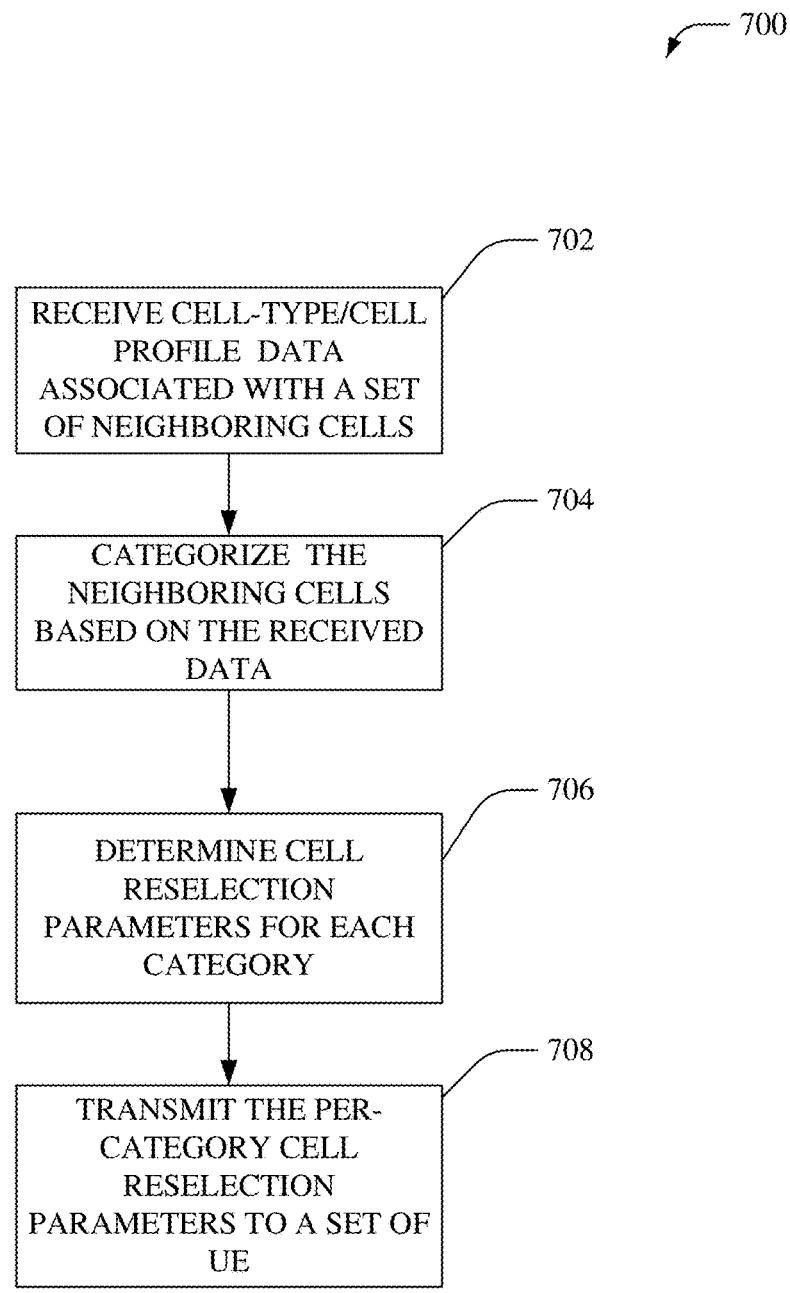
FIG. 7 illustrates an example method that transmits cell reselection parameters for different categories.
Figure 8:
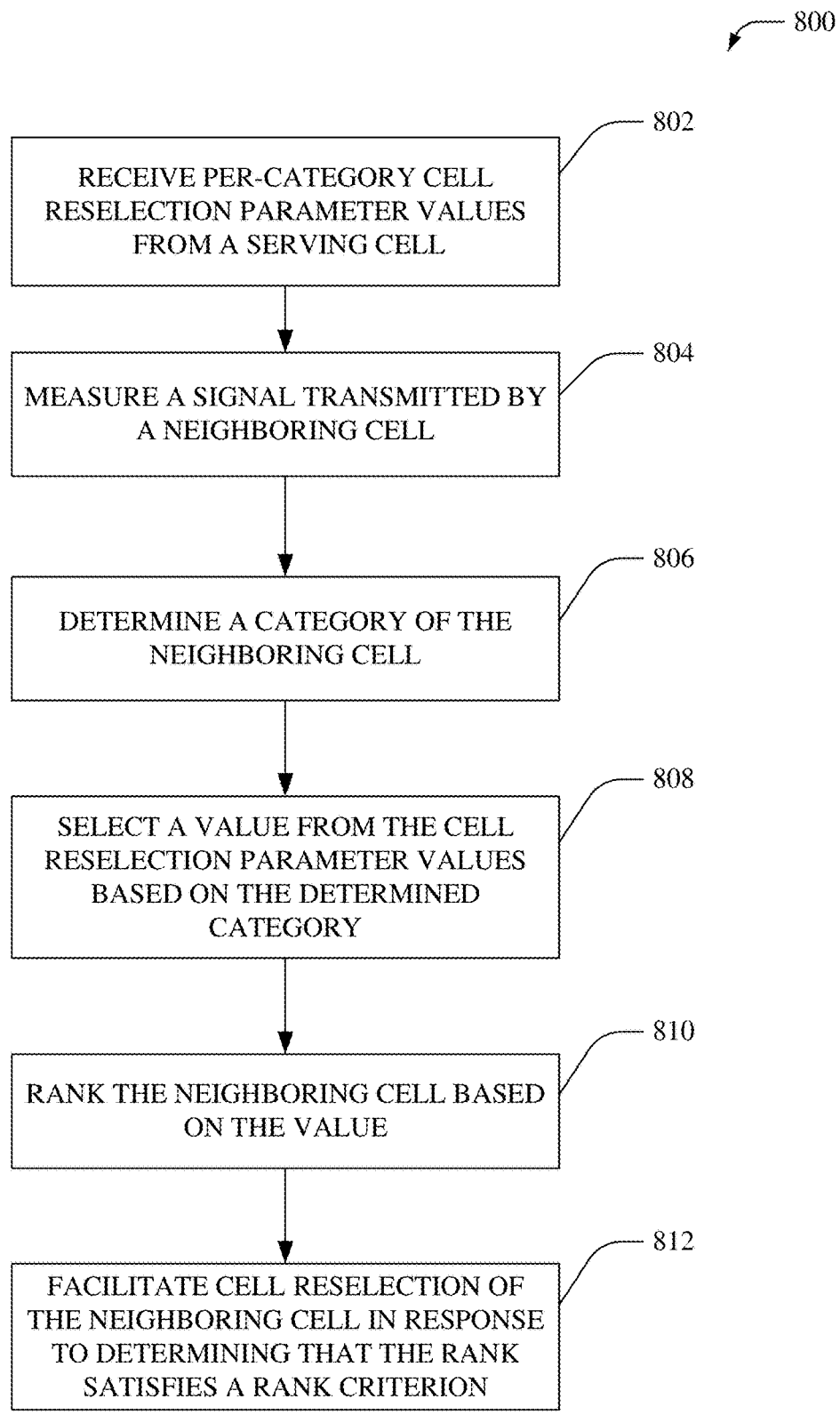
FIG. 8 illustrates an example method for cell reselection for connection of a UE to a neighbor cell.

FIGS. 7-8 illustrate flow diagrams and/or methods in accordance with the disclosed subject matter. For simplicity of explanation, the flow diagrams and/or methods are depicted and described as a series of acts. It is to be understood and appreciated that the various embodiments are not limited by the acts illustrated and/or by the order of acts, for example acts can occur in various orders and/or concurrently, and with other acts not presented and described herein. Furthermore, not all illustrated acts may be required to implement the flow diagrams and/or methods in accordance with the disclosed subject matter. In addition, those skilled in the art will understand and appreciate that the methods could alternatively be represented as a series of interrelated states via a state diagram or events. Additionally, it should be further appreciated that the methods disclosed hereinafter and throughout this specification are capable of being stored on an article of manufacture to facilitate transporting and transferring such methods to computers. The term article of manufacture, as used herein, is intended to encompass a computer program accessible from any computer-readable device or computer-readable storage/ communications media.

Referring now to FIG. 7, illustrated is an example method 700 that transmits cell reselection parameters for different categories, according to an aspect of the subject disclosure. As an example, method 700 can be implemented by one or more network devices of a RAN, for example, a serving access point (e.g., base station, eNB, HNB, HeNB, etc.) In another example, method 700 can be implemented (at least partially) by one or more devices of a core mobility network (e.g., a network management system).

At 702, data associated with a set of neighboring cells, such as, but not limited to a cell-type data (e.g., that represents capabilities/features/characteristics of a cell) and/ or cell-profile data (e.g., antenna tilt/pattern, power level, MIMO, carrier aggregation, indoor/outdoor location, public/ privately owned, cell capacity, etc.), can be received, for example, by a serving cell. In one example, the data can be received via an X2 interface (e.g., as part of a setup message and/or subsequent to the setup of the X2 interface). In another example, the data can be received via one or more network devices, for example, within the RAN and/or core mobility network. In yet another example, the data can be extracted from enhanced UE history data received from one or more UEs that are coupled to the serving cell. At 704, the set of the neighboring cells can be categorized based on the received data. For example, the categories can include, but are not limited to, macro cells, metro cells, femtocells, pico cells, etc.

At 706, cell reselection parameters can be determined for each category. In one aspect, offset data (e.g. Qoffset) can be determined for the different categories. For example, a first Qoffset value (e.g., q-OffsetToMacro) can be assigned to all macro cells, a second Qoffset value (e.g., q-OffsetToMetro) can be assigned to all metro cells, a third Qoffset value (e.g., q-OffsetToFemto) can be assigned to all femtocells, a fourth Qoffset value (e.g., q-OffsetToPico) can be assigned to all pico cells, and so on. The Qoffset values can be predefined and/or dynamically determined, for example, based on a service provider policy. It can be noted that, a Qoffset value for a specific neighboring cell (n) in relation to the serving cell (s) can also be determined (e.g., q-Offset$_{s,n}$). At 708, the per category cell reselection parameters can be transmitted to the UEs. Moreover, the per category cell reselection parameters can be transmitted periodically, at a defined time, based on expiration of an event, on-demand, etc. As an example, the per category cell reselection parameters can be transmitted via one or more cell broadcast messages, such as, but not limited to, a System Information Block (SIB) messages, over one or more layers (different radio access technologies (RATs) and/or frequencies). In one embodiment, the cell reselection parameters can be included within or appended to an SIB message that contains other information. Alternatively, the cell reselection parameters can be transmitted as a new SIB message.

FIG. 8 illustrates an example method 800 that facilitates cell reselection for connection of a UE to a neighboring cell, according to an aspect of the subject disclosure. As an example, method 800 can be implemented by a UE coupled to serving access point, for example, during idle and/or connected mode. At 802, per category cell reselection parameter values can be received from a serving cell. As an example, the per category cell reselection parameter values can include different Qoffset values assigned to the different categories.

At 804, a signal transmitted by a neighboring cell can be measured. At 806, a category of the neighboring cell can be determined, for example, based on a result of the measurement. In one example, the PCI of the neighboring cell can be compared to a defined PCI range reserved for metro cells. If the PCI falls within the defined PCI range, the neighboring cell can be categorized as a metro cell; else, the neighboring cell can be categorized as a macro cell. At 808, based on the determined category a cell reselection parameters value can be selected from the per category cell reselection parameter values. Moreover, if the neighboring cell is categorized as a metro cell, the cell reselection parameter values assigned to the metro cell category can be selected, if the neighboring cell is categorized as a macro cell, the cell reselection parameter values assigned to the macro cell category can be selected, etc. As an example, for Qoffset parameters, if determined that the serving cell is a macro cell and the neighboring cell is a metro cell, a q-OffsetToMetro value can be used as the Qoffset, and if determined that the serving cell is a metro cell and the neighboring cell is a macro cell, a q-OffsetToMacro value can be used as the Qoffset. Further, if determined that the both the serving cell and the neighboring cell belong to the same category, e.g., both the serving cell and the neighboring cell are either macro or metro cells, the Qoffset value can be set as zero.

At 810, the neighboring cell can be ranked based on the selected cell reselection parameter value. Further, at 812, cell reselection of the neighboring cell can be facilitated in response to determining that the rank of the neighboring cell satisfies a rank criterion (e.g., the rank is higher than a disparate rank assigned to a disparate neighboring cell).

Figure 9:
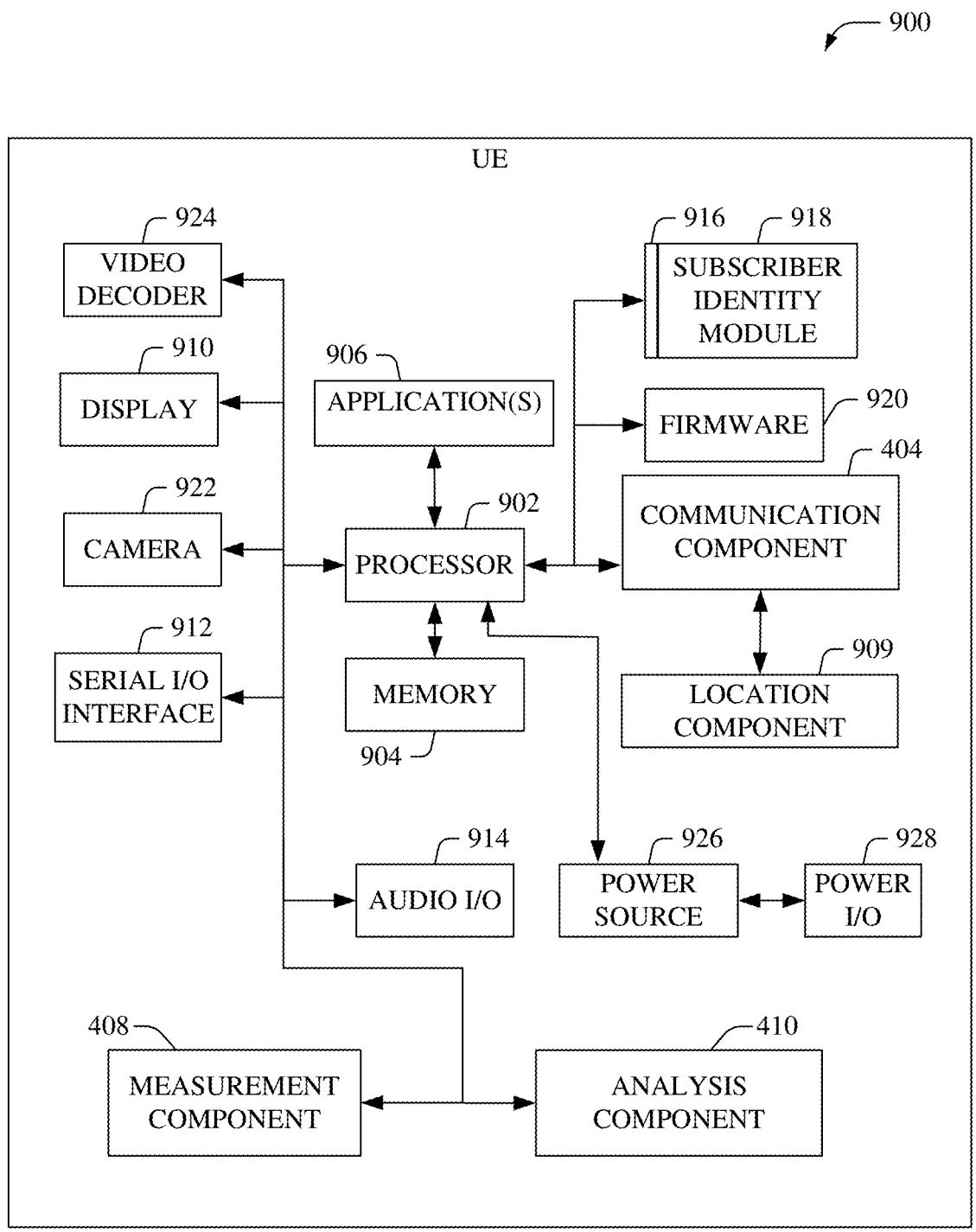
FIG. 9 illustrates an example block diagram of a UE suitable for cell reselection based on per category cell reselection parameters.

Referring now to FIG. 9, there is illustrated a block diagram of a UE 900 that facilitate network reselection based on per category cell reselection parameters in accordance with the subject specification. Moreover, the UE 900 can be substantially similar to and include functionality associated with UEs 104, UE 308, and/or UE 402 described herein. In one aspect, the UE 900 can include a processor 902 for controlling all onboard operations and processes. A memory 904 can interface to the processor 902 for storage of data (e.g., including data retained in UE data store 406) and one or more applications 906 being executed by the processor 902. The communication component 404 can interface to the processor 902 to facilitate wired/wireless communication with external systems (e.g., via serving access point 102). The communication component 404 can interface to a location component 909 (e.g., GPS transceiver) that can facilitate location detection of the UE 900. The communication component 404 can be stored in memory 904 and/or implemented by an application 906, can include respective functionality, as more fully described herein, for example, with regard to systems 400.

The UE 900 can include a display 910 for displaying received content (and/or content to be transferred) and/or for displaying text information related to operating and using the device features. A serial I/O interface 912 is provided in communication with the processor 902 to facilitate serial communication (e.g., USB, and/or IEEE 1394) via a hardwire connection. Audio capabilities are provided with an audio I/O component 914, which can include a speaker for the output of audio signals related to, for example, recorded data or telephony voice data, and a microphone for inputting voice signals for recording and/or telephone conversations.

Further, the UE 900 can include a slot interface 916 for accommodating a subscriber identity module (SIM) 918. Firmware 920 is also provided to store and provide to the processor 902 startup and operational data. The UE 900 can also include an image capture component 922 such as a camera and/or a video decoder 924 for decoding encoded multimedia content. Further, the UE 900 can include a power source 926 in the form of batteries, which power source 926 interfaces to an external power system or charging equipment via a power I/O component 928. In addition, the UE 900 can include the measurement component 408, and the analysis component 410, which can be stored in memory 904 and/or implemented by an application 906, can include respective functionality, as more fully described herein, for example, with regard to systems 400-500.

Figure 10:
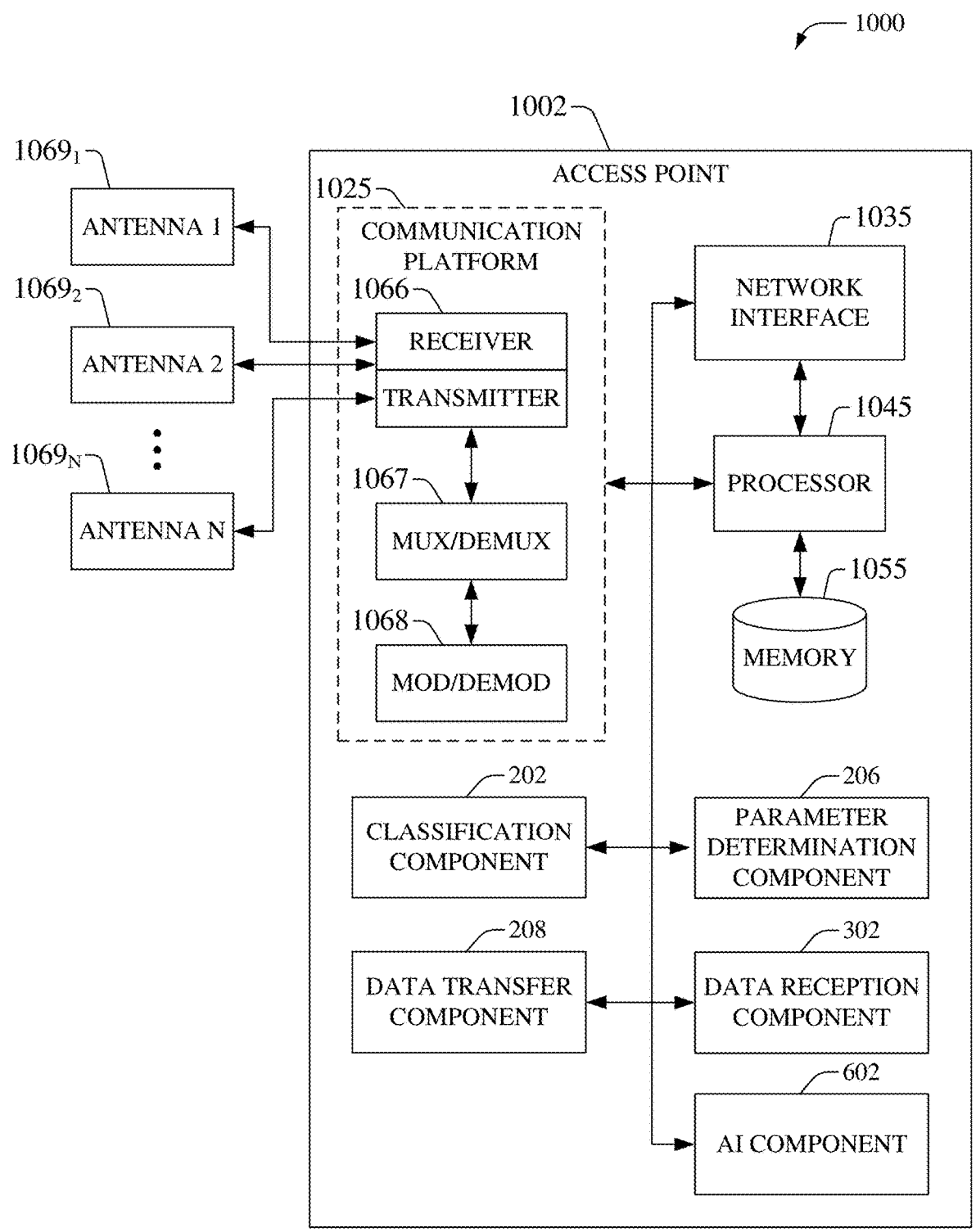
FIG. 10 illustrates an example block diagram of an access point suitable for determining and transmitting per category cell reselection parameters.
Figure 11:
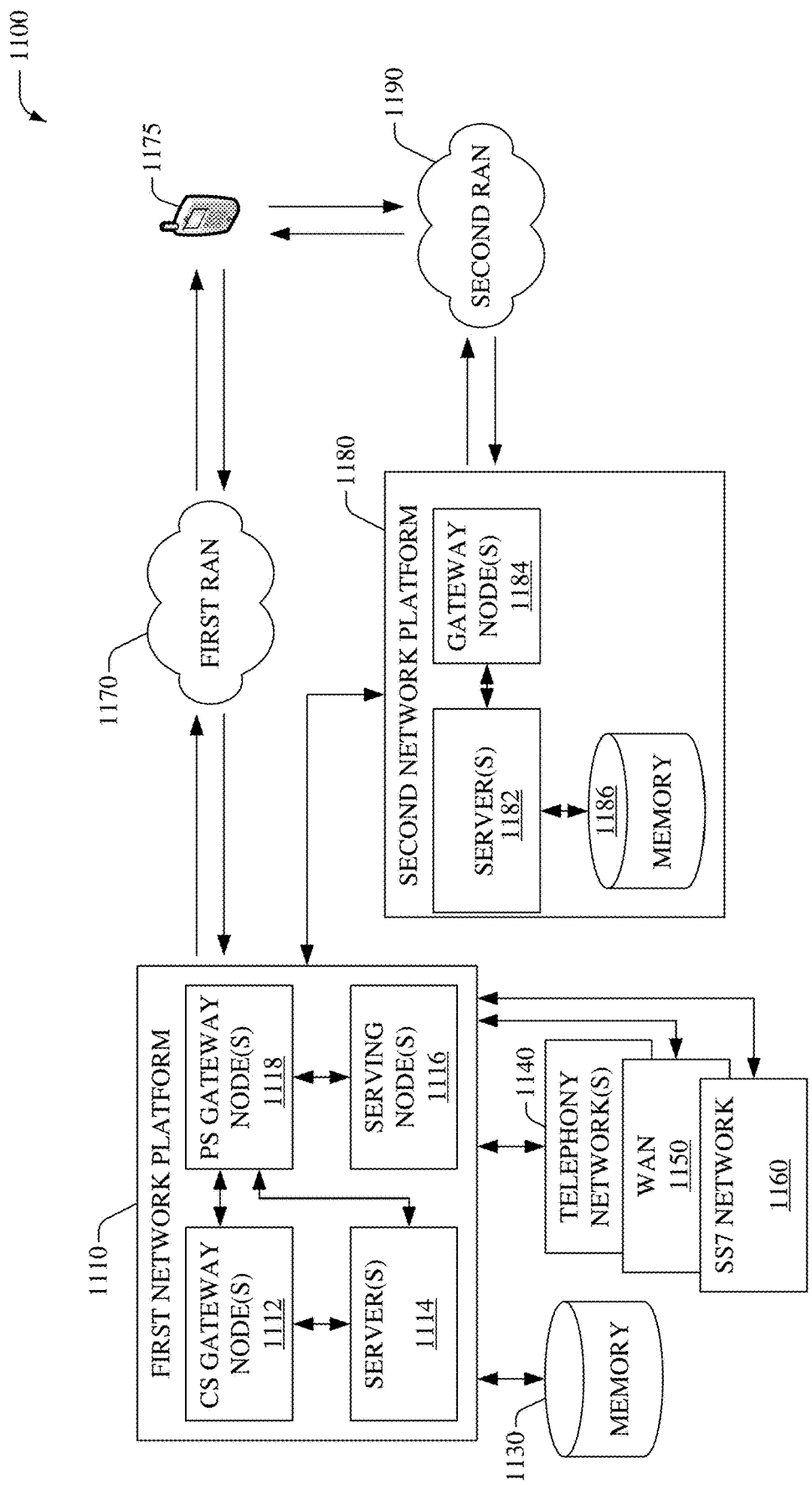
FIG. 11 illustrates an example wireless communication environment for cell reselection based on categorized cell reselection parameters.

To provide further context for various aspects of the subject specification, FIGS. 10 and 11 illustrate, respectively, a block diagram of an example embodiment 1000 of an access point that facilitates cell reselection based on per category parameters and a wireless communication environment 1100, with associated components for operation of efficient cell reselection in accordance with aspects described herein.

With respect to FIG. 10, in example embodiment 1000 comprises an access point 1002. As an example, the serving access point 102 and/or the neighbor access points 106 disclosed herein with respect to systems 100-400 and 600 can each include at least a portion of the access point 1002. In one aspect, the access point 1002 can receive and transmit signal(s) (e.g., traffic and control signals) from and to wireless devices, access terminals, wireless ports and routers, etc., through a set of antennas $1069_1$-$1069_N$. It should be appreciated that while antennas $1069_1$-$1069_N$ are a part of communication platform 1025, which comprises electronic components and associated circuitry that provides for processing and manipulating of received signal(s) (e.g., a packet flow) and signal(s) (e.g., a broadcast control channel) to be transmitted. In an aspect, communication platform 1025 can include a transmitter/receiver (e.g., a transceiver) 1066 that can convert signal(s) from analog format to digital format (e.g., analog-to-digital conversion) upon reception, and from digital format to analog (e.g., digital-to-analog conversion) format upon transmission. In addition, receiver/transmitter 1066 can divide a single data stream into multiple, parallel data streams, or perform the reciprocal operation. Coupled to transceiver 1066 is a multiplexer/demultiplexer 1067 that facilitates manipulation of signal in time and/or frequency space. Electronic component 1067 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM), etc. In addition, mux/demux component 1067 can scramble and spread information (e.g., codes) according to substantially any code known in the art; e.g., Hadamard-Walsh codes, Baker codes, Kasami codes, polyphase codes, and so on. A modulator/demodulator 1068 is also a part of operational group 1025, and can modulate information according to multiple modulation techniques, such as frequency modulation, amplitude modulation (e.g., M-ary quadrature amplitude modulation (QAM), with M a positive integer), phase-shift keying (PSK), and the like.

Access point 1002 also includes a processor 1045 configured to confer functionality, at least partially, to substantially any electronic component in the access point 1002, in accordance with aspects of the subject disclosure. In particular, processor 1045 can facilitates implementing configuration instructions received through communication platform 1025, which can include storing data in memory 1055. In addition, processor 1045 facilitates processing data (e.g., symbols, bits, or chips, etc.) for multiplexing/demultiplexing, such as effecting direct and inverse fast Fourier transforms, selection of modulation rates, selection of data packet formats, inter-packet times, etc. Moreover, processor 1045 can manipulate antennas $1069_1$-$1069_N$ to facilitate beamforming or selective radiation pattern formation, which can benefit specific locations covered by the access point 1002; and exploit substantially any other advantages associated with smart-antenna technology. Memory 1055 can store data structures, code instructions, system or device information like device identification codes (e.g., International Mobile Station Equipment Identity (IMEI), Mobile Station International Subscriber Directory Number (MSISDN), serial number . . . ) and specification such as multimode capabilities; code sequences for scrambling; spreading and pilot transmission, floor plan configuration, access point deployment and frequency plans; and so on. Moreover, memory 1055 can store configuration information such as schedules and policies; geographical indicator (s); cell-type data and/or cell profile data (e.g., of access point 1002 and/or neighboring access points), cell reselection parameter data, historical logs, and so forth. In one example, data store 204 can be implemented in memory 1055.

In embodiment 1000, processor 1045 can be coupled to the memory 1055 in order to store and retrieve information necessary to operate and/or confer functionality to communication platform 1025, network interface 1035 (e.g., that coupled the access point to core network devices such as but not limited to a network controller), and other operational components (e.g., multimode chipset(s), power supply sources . . . ; not shown) that support the access point 1002. The access point 1002 can further include a classification component 202, a parameter determination component 206, a data transfer component 208, a data reception component 302, and/or an AI component 602 which can include functionality, as more fully described herein, for example, with regard to systems 100-400 and 600. In addition, it is to be noted that the various aspects disclosed in the subject specification can also be implemented through (i) program modules stored in a computer-readable storage medium or memory (e.g., memory 1055) and executed by a processor (e.g., processor 1045), or (ii) other combination(s) of hardware and software, or hardware and firmware.

Referring now to FIG. 11, there illustrated is a wireless communication environment 1100 that includes two wireless network platforms: (i) A first network platform 1110 (e.g., macro network platform) that serves, or facilitates communication with user equipment 1175 via a first RAN 1170. As an example, in cellular wireless technologies (e.g., 3GPP UMTS, HSPA, 3GPP LTE, 3GPP UMB, 4G LTE, etc.), the first network platform 1110 can be embodied in a Core Network; and (ii) A second network platform 1180 (e.g., macro network platform, femto network platform, wireless local area network (WLAN) platform, etc.), which can provide communication with UE 1175 through a second RAN 1190 linked to the second network platform 1180. It should be noted that the second network platform 1180 can offload UE 1175 from the first network platform 1110, once UE 1175 attaches (e.g., based on the per category reselection parameters described herein) to the second RAN. In one example, the first RAN and the second RAN can be commonly operated and/or deployed by a common service provider. Further, it can be noted that in one example (not shown) the second RAN 1190 can be directly coupled to the first network platform 1110.

It is noted that RAN (1170 and/or 1190) includes base station(s), or access point(s), and its associated electronic circuitry and deployment site(s), in addition to a wireless radio link operated in accordance with the base station(s). Accordingly, the first RAN 1170 can comprise various access points like serving access point 102, while the second RAN 1190 can comprise multiple access points like neighbor access point 106. Moreover, the UE 1175 can be substantially similar to and include functionality associated with UEs 104, UE 308, UE 402, and/or UE 900 described herein.

Both the first and the second network platforms 1110 and 1180 can include components, e.g., nodes, gateways, interfaces, servers, or platforms, that facilitate packet-switched (PS) and/or circuit-switched (CS) traffic (e.g., voice and data) and control generation for networked wireless communication. For example, the first network platform 1110 includes CS gateway node(s) 1112 which can interface CS traffic received from legacy networks like telephony network(s) 1140 (e.g., public switched telephone network (PSTN), or public land mobile network (PLMN)) or a SS7 network 1160. Moreover, CS gateway node(s) 1112 interfaces CS-based traffic and signaling and gateway node(s) 1118. In addition to receiving and processing CS-switched traffic and signaling, gateway node(s) 1118 can authorize and authenticate PS-based data sessions with served (e.g., through the first RAN 1170) wireless devices. Data sessions can include traffic exchange with networks external to the first network platform 1110, like wide area network(s) (WANs) 1150; it should be appreciated that local area network(s) (LANs) can also be interfaced with first network platform 1110 through gateway node(s) 1118. Gateway node(s) 1118 generates packet data contexts when a data session is established. It should be further appreciated that the packetized communication can include multiple flows that can be generated through server(s) 1114. The first network platform 1110 also includes serving node(s) 1116 that conveys the various packetized flows of information or data streams, received through gateway node(s) 1118. It is to be noted that server(s) 1114 can include one or more processors configured to confer at least in part the functionality of first network platform 1110. To that end, one or more processors can execute code instructions stored in memory 1130 or other computer-readable medium, for example.

In example wireless environment 1100, memory 1130 can store information related to operation of first network platform 1110. Information can include business data associated with subscribers; market plans and strategies, e.g., promotional campaigns, business partnerships; operational data for mobile devices served through first network platform; service and privacy policies; end-user service logs for law enforcement; and so forth. Memory 1130 can also store information from at least one of telephony network(s) 1140, WAN(s) 1150, or SS7 network 1160. Many different types of information can be stored in memory 1130 without departing from example embodiments.

Gateway node(s) 1184 can have substantially the same functionality as PS gateway node(s) 1118. Additionally or optionally, the gateway node(s) 1184 can also include substantially all functionality of serving node(s) 1116. In an aspect, the gateway node(s) 1184 can facilitate handover resolution, e.g., assessment and execution. Server(s) 1182 have substantially the same functionality as described in connection with server(s) 1114 and can include one or more processors configured to confer at least in part the functionality of the first network platform 1110. In one example, the network management system 304 can be implemented or executed by server(s) 1182 and/or server(s) 1114. To that end, the one or more processor can execute code instructions stored in memory 1186, for example.

Memory 1186 can include information relevant to operation of the various components of the second network platform 1180. For example operational information that can be stored in memory 1186 can comprise, but is not limited to, subscriber information; contracted services; maintenance and service records; cell configuration (e.g., devices served through second RAN 1190; access control lists, or white lists); service policies and specifications; privacy policies; add-on features; and so forth.

Figure 12:
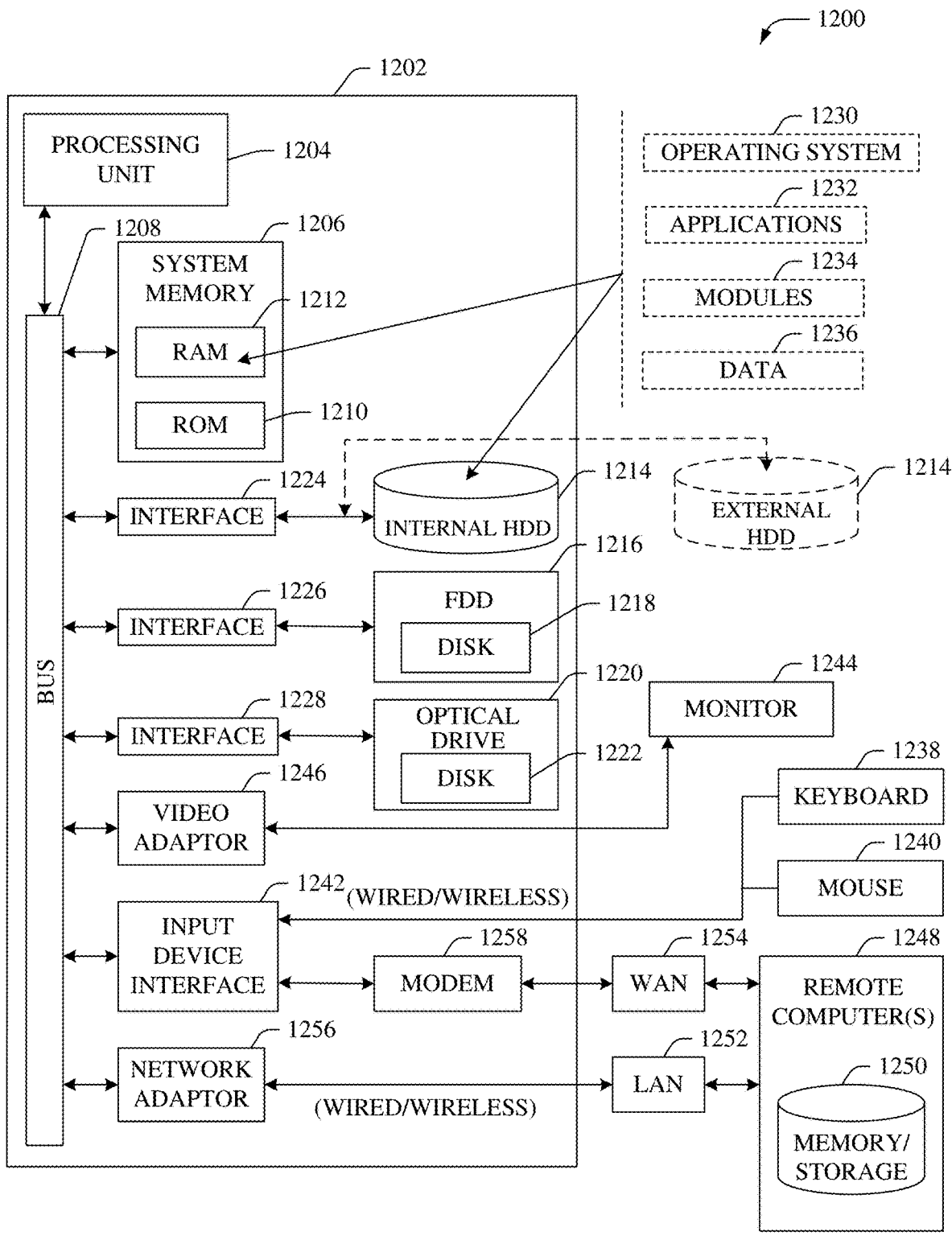
FIG. 12 illustrates a block diagram of a computer operable to execute the disclosed communication architecture.

Referring now to FIG. 12, there is illustrated a block diagram of a computer 1202 operable to execute the disclosed communication architecture. In order to provide additional context for various aspects of the disclosed subject matter, FIG. 12 and the following discussion are intended to provide a brief, general description of a suitable computing environment 1200 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, radio frequency (RF), infrared and other wireless media.

With reference again to FIG. 12, the example environment 1200 for implementing various aspects of the specification includes a computer 1202, the computer 1202 including a processing unit 1204, a system memory 1206 and a system bus 1208. As an example, the component(s), server(s), equipment, system(s), and/or device(s) (e.g., serving access point 102, neighbor access point 106, UEs 104, classification component 202, parameter determination component 206, data transfer component 208, data reception component 302, network management system 304, UE 308, communication component 404, measurement component 408, analysis component 410, type determination component 502, ranking component 504, cell reselection component 506, AI component 602, UE 900, access point 1002, first network platform 1110, second network platform 1180, etc.) disclosed herein with respect to system 100-600 and 900-1100 can each include at least a portion of the computer 1202. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes read-only memory (ROM) 1210 and random access memory (RAM) 1212. A basic input/output system (BIOS) is stored in a non-volatile memory 1210 such as ROM, EPROM, EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214, which internal hard disk drive 1214 can also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1394 interface technologies. Other external drive connection technologies are within contemplation of the subject disclosure.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to a HDD, a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods of the specification.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is appreciated that the specification can be implemented with various commercially available operating systems or combinations of operating systems.

A user can enter commands and information into the computer 1202 through one or more wired/wireless input devices, e.g., a keyboard 1238 and/or a pointing device, such as a mouse 1240 or a touchscreen or touchpad (not illustrated, but which may be integrated into UE 104 in some embodiments). These and other input devices are often connected to the processing unit 1204 through an input device interface 1242 that is coupled to the system bus 1208, but can be connected by other interfaces, such as a parallel port, an IEEE 1394 serial port, a game port, a USB port, an infrared (IR) interface, etc. A monitor 1244 or other type of display device is also connected to the system bus 1208 via an interface, such as a video adapter 1246.

The computer 1202 can operate in a networked environment using logical connections via wired and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 is connected to the local network 1252 through a wired and/or wireless communication network interface or adapter 1256. The adapter 1256 can facilitate wired or wireless communication to the LAN 1252, which can also include a wireless access point disposed thereon for communicating with the wireless adapter 1256.

When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 via the serial port interface 1242. In a networked environment, program modules depicted relative to the computer 1202, or portions thereof, can be stored in the remote memory/storage device 1250. It will be appreciated that the network connections shown are example and other means of establishing a communications link between the computers can be used.

The computer 1202 is operable to communicate with any wireless devices or entities operatively disposed in wireless communication, e.g., desktop and/or portable computer, server, communications satellite, etc. This includes at least WiFi and Bluetooth™ wireless technologies. Thus, the communication can be a predefined structure as with a conventional network or simply an ad hoc communication between at least two devices.

WiFi, or Wireless Fidelity, allows connection to the Internet from a couch at home, a bed in a hotel room, or a conference room at work, without wires. WiFi is a wireless technology similar to that used in a cell phone that enables such devices, e.g., computers, to send and receive data indoors and out; anywhere within the range of a base station. WiFi networks use radio technologies called IEEE 802.11 (a, b, g, n, etc.) to provide secure, reliable, fast wireless connectivity. A WiFi network can be used to connect computers to each other, to the Internet, and to wired networks (which use IEEE 802.3 or Ethernet). WiFi networks operate in the unlicensed 5 GHz radio band at an 54 Mbps (802.11a) data rate, and/or a 2.4 GHz radio band at an 11 Mbps (802.11b), an 54 Mbps (802.11g) data rate, or up to an 600 Mbps (802.11n) data rate for example, or with products that contain both bands (dual band), so the networks can provide real-world performance similar to the basic 10 BaseT wired Ethernet networks used in many offices.

As employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
a processor; and
a memory that stores executable instructions that, when executed by the processor, facilitate performance of operations, comprising:
determining parameter data indicative of a first common parameter associated with first access point devices that are determined to belong to a first common category and a second common parameter associated with second access point devices that are determined to belong to a second common category, and
facilitating a transmission of data signals indicative of the parameter data to a user equipment to facilitate cell reselection associated with the user equipment, wherein the first common parameter and the second common parameter are employable to bias a ranking of the first access point devices and the second access point devices, respectively, and wherein the ranking is to be employed to select an access point device, from the first access point devices and the second access point devices, to which the user equipment is to initiate a connection to facilitate the cell reselection.

2. The system of claim 1, wherein the first common category is associated with a common cell type associated with the first access point devices.

3. The system of claim 2, wherein the common cell type comprises a metro cell type.

4. The system of claim 1, wherein the operations further comprise:
based on cell-type data received from the first access point devices, determining that the first access point devices belong to the first common category.

5. The system of claim 4, wherein the operations further comprise:
receiving the cell-type data via a communication link that employs an access point-to-access point signaling protocol.

6. The system of claim 5, wherein the cell-type data represents a capability of one of the first access point devices.

7. The system of claim 1, wherein the parameter data is determined based on defined policy data received from a network device.

8. The system of claim 1, wherein the parameter data is determined based on network traffic data.

9. The system of claim 1, wherein the parameter data is determined based on network congestion data.

10. The system of claim 1, wherein the facilitating comprises facilitating the transmission in response to determining an occurrence of an event.

11. The system of claim 1, wherein the facilitating comprises facilitating the transmission via a broadcast message.

12. A method, comprising:
determining, by a system comprising a processor, parameter data indicative of a first common parameter associated with first access point devices that are determined to belong to a first common category and a second common parameter associated with second access point devices that are determined to belong to a second common category, and
facilitating, by the system, a transmission of data signals indicative of the parameter data to a user equipment to facilitate cell reselection associated with the user equipment, wherein the first common parameter and the second common parameter are employable to bias rankings of the first access point devices and the second access point devices, respectively, and wherein the rankings are to be employed to select an access point device, from the first access point devices and the second access point devices, to which the user equipment is to initiate a connection to facilitate the cell reselection.

13. The method of claim 12, wherein the determining the parameter data comprises determining the parameter data based on defined policy data received from a network device.

14. The method of claim 12, wherein the determining the parameter data comprises determining the parameter data based on network traffic data.

15. The method of claim 12, wherein the determining the parameter data comprises determining the parameter data based on network congestion data.

16. The method of claim 12, wherein the facilitating the transmission comprises facilitating the transmission in response to determining an occurrence of an event.

17. The method of claim 12, wherein the facilitating the transmission comprises facilitating the transmission via a broadcast message.

18. A machine-readable storage device comprising instructions that, when executed by a processor, facilitate performance of operations, comprising:
determining parameter data indicative of a first common parameter associated with first access point devices that are determined to belong to a first common category and a second common parameter associated with second access point devices that are determined to belong to a second common category, and
directing, to a user equipment, data signals indicative of the parameter data to facilitate cell reselection associated with the user equipment, wherein the first common parameter and the second common parameter are employable to bias a ranking of the first access point devices and the second access point devices, respectively, and wherein a result of the ranking is to be employed to select an access point device, from the first access point devices and the second access point devices, to which the user equipment is to initiate a connection to facilitate the cell reselection.

19. The machine-readable storage device of claim 18, wherein the parameter data is determined based on defined policy data received from a network device.

20. The machine-readable storage device of claim 18, wherein the first common category comprises a metro cell category and the second common category comprises a macro cell category.

* * * * *